(12) United States Patent
Li et al.

(10) Patent No.: US 7,352,902 B2
(45) Date of Patent: Apr. 1, 2008

(54) SYSTEM AND METHOD FOR DETECTING A HAND-DRAWN OBJECT IN INK INPUT

(75) Inventors: Yantao Li, Beijing (CN); Jian Wang, Beijing (CN)

(73) Assignee: Microsoft Corporation, Redmond, WA (US)

(*) Notice: Subject to any disclaimer, the term of this patent is extended or adjusted under 35 U.S.C. 154(b) by 693 days.

(21) Appl. No.: 10/850,948

(22) Filed: May 20, 2004

(65) Prior Publication Data

US 2005/0063594 A1 Mar. 24, 2005

Related U.S. Application Data

(60) Provisional application No. 60/505,866, filed on Sep. 24, 2003.

(51) Int. Cl.
G06K 9/52 (2006.01)

(52) U.S. Cl. .................................. 382/206; 382/224

(58) Field of Classification Search ................ 382/181, 382/186–189, 202–203, 206, 209, 224–225
See application file for complete search history.

(56) References Cited

U.S. PATENT DOCUMENTS

| 5,038,382 | A | * | 8/1991 | Lipscomb | 382/189 |
| 5,517,578 | A | | 5/1996 | Altman et al. | |
| 5,544,265 | A | * | 8/1996 | Bozinovic et al. | 382/203 |
| 5,615,283 | A | * | 3/1997 | Donchin | 382/187 |
| 5,864,635 | A | * | 1/1999 | Zetts et al. | 382/187 |
| 6,525,749 | B1 | | 2/2003 | Moran et al. | |
| 7,136,082 | B2 | * | 11/2006 | Saund et al. | 345/619 |
| 7,139,004 | B2 | | 11/2006 | Saund et al. | |
| 2004/0090439 | A1 | * | 5/2004 | Dillner | 345/440 |
| 2005/0063591 | A1 | | 3/2005 | Chen | |
| 2005/0063592 | A1 | | 3/2005 | Li | |

FOREIGN PATENT DOCUMENTS

EP 1331592 A 7/2003

OTHER PUBLICATIONS

Fonseca, et al "Experimental evaluation of an on-line scribble recognizer" Pattern Recognition Letters, pp. 1311-1319, 2001.*

(Continued)

*Primary Examiner*—Daniel Mariam
(74) *Attorney, Agent, or Firm*—Workman Nydegger

(57) ABSTRACT

A system and method for detection of hand-drawn objects in ink input is provided. A detector may detect a drawing such as a diagram or chart from ink input by detecting closed containers and/or unclosed connectors in the drawing. An efficient grid-based approach may be used for fitting the ink strokes into an image grid with an appropriate size. A flood-fill algorithm may be used to detect the containers and connectors. A time order search may also be performed after a spatial search to handle overlapping of drawing strokes. Finally, content detection may be performed for each detected container. Once any containers and their associated content have been detected in the image grid, connector detection may be performed. By using the present invention, a user may draw diagrams and flow charts freely and without restrictions on the hand-drawn input.

38 Claims, 22 Drawing Sheets

OTHER PUBLICATIONS

Apte, et al "Recognizing multistroke geometric shapes: an experimental evaluation", Washington University, pp. 122-128, 1993.*

Lank, et al "An interactive system for recognizing hand drawn UML diagrams", ACM, pp. 1-15, 2000.*

Kojima,H, et al. "Online hand-drawn line-figure recognition and its application" Proceedings of the International Conference on Pattern Recognition. pp. 1138-1142.

Galindo, D., et al.: "Perceptually-based representation of network diagrams": Proceedings of the 4th International Conference on Document Analysis and Recognition, pp. 352-356.

International Search Report in Corresponding EP Application No. EP 04019840.2218.

Office Action mailed Jun. 28, 2007, cited in related application, U.S. Appl. No. 10/850,680.

Office Action mailed Jun. 15, 2007, cited in related application, U.S. Appl. No. 10/850,718.

Notice of Allowance mailed Aug. 10, 2007, cited in related application U.S. Appl. No.: 10/850,680.

* cited by examiner

SYSTEM AND METHOD FOR DETECTING A HAND-DRAWN OBJECT IN INK INPUT

CROSS-REFERENCE TO RELATED APPLICATIONS

The present invention claims priority to U.S. provisional patent application Ser. No. 60/505,866 filed Sep. 24, 2003, and incorporated herein in its entirety.

The present invention is related to the following United States patent applications, filed concurrently herewith and incorporated herein in their entireties:

application Ser. No. 10/850,718 "System And Method For Shape Recognition of Hand-Drawn Objects" and application Ser. No. 10/850,680 "System And Method For Detecting A List In Ink Input."

FIELD OF THE INVENTION

The invention relates generally to computer systems, and more particularly to an improved system and method for detecting a hand-drawn object in ink input.

BACKGROUND OF THE INVENTION

The ability to detect and recognize the shape of hand-drawn objects is important for users to be able to draw directly on their computers using ink input or ink notes. Current hardware and software may be able to capture ink representing handwriting reasonably well but is currently unable to similarly recognize and represent the meaning of hand-drawn objects. As a result, users instead use menu-based application programs to create drawings of objects. Various shapes may be presented by such application programs for a user to select and copy onto a drawing grid. The copied shape may then be resized to the desired scale and a user may continue to place and resize additional shapes onto the drawing grid until the drawing is complete.

Research focused on shape recognition of hand-drawn objects has yielded marginal results to date. For instance, incremental recognition algorithms have been used that may recognize simple geometric shapes such as a circle or a box from a specific number of strokes made in a particular order. However, such incremental algorithms rely on stroke order and/or assume a particular number of strokes in order to recognize a particular hand-drawn shape. Such an approach fails to be robust for several reasons. First of all, none of the incremental algorithms solves the grouping problem of deciding which collection of strokes belongs together because those strokes represent a specific shape. Without the ability to group strokes together that belong to a shape, incremental algorithms may not accommodate multi-stroke shapes such as arrows. Moreover, because incremental algorithms rely on stroke order and/or assume a particular number of strokes for a shape, the incremental algorithms are unable to solve the overtracing problem where a stroke may be overtraced during drawing of a shape.

What is needed is a way for detecting and recognizing the shape of hand-drawn objects that is insensitive to stroke input order and/or the number of strokes required to form any given shape. Any such system and method should be able to detect multi-stroke hand-drawn shapes and be able to decide which collection of strokes belong together that represent different shapes.

SUMMARY OF THE INVENTION

Briefly, the present invention provides a system and method for detecting a hand-drawn object in ink input. To this end, a detector is provided that may detect a drawing such as a diagram or chart in ink input. The detector may include a container detector for finding strokes that belong to a container and a connector detector for finding strokes that belong to a connector. Hand-drawn shapes may be detected by performing a spatial search and a time order search to identify the strokes for each container.

One embodiment may fit the ink strokes into an image grid with an appropriate size and mark the grids that intersect with drawing strokes. Beginning with the exterior edges of the image grid, the outmost blank grids may be flood-filled until reaching the marked grids that intersect with drawing strokes. Then, any islands of blank grids appearing within the marked grids may be flood-filled until reaching the borders of an island. The drawing strokes of container candidates may then be identified from the borders surrounding the flood-filled islands. Any container candidates may be checked to confirm that they are valid containers.

In one embodiment, a time order search may also be performed after a spatial search to handle overlapping of drawing strokes. In general, containers formed from a sequence of consecutive strokes may be found using a time order search by determining the likelihood that a sequence of input strokes forms a container. Any additional containers found by performing a time order search may be marked in the image grid used for the spatial search, so that any found containers may be included in the image grid for later use during content detection and connector detection.

Once any containers and their associated content have been detected in the image grid, connector detection may be performed. In general, a search may be performed in the image grid that has been marked with containers to detect any connectors among the grids of the unvisited drawing strokes. Any containers that are not adjacent with the unvisited drawing strokes may be inflated with marked grids surrounding the border of the containers so that the connectors may be adjacent to the corresponding containers. Then, the grids of the unvisited drawing strokes may be flood-filled and those flood-filled grids reaching two or more containers, including inflated containers, may identify the corresponding drawing strokes of a connector candidate. Any connector candidates may be checked to confirm that they are valid connectors.

Advantageously, the system and method are insensitive to stroke input order and the number of strokes that may form a hand-drawn shape. Furthermore, the system and method may be used to detect any closed containers and unclosed connectors in a drawing. Once detected, the type, location, orientation and size of the shape may be recognized.

Other advantages will become apparent from the following detailed description when taken in conjunction with the drawings, in which:

DETAILED DESCRIPTION

Exemplary Operating Environment

Figure 1:
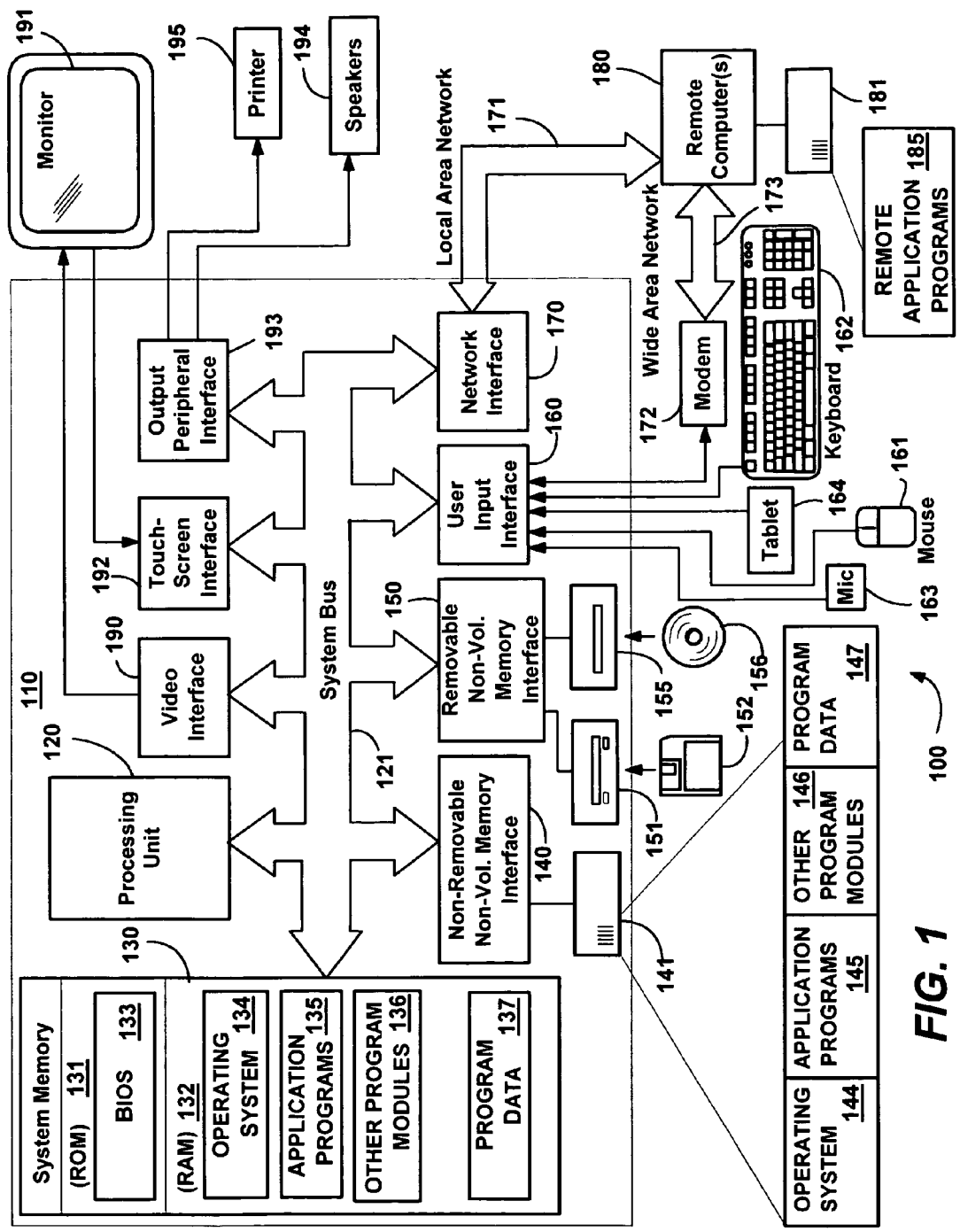
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Detecting a Hand-Drawn Object

The present invention is generally directed towards a system and method for detecting a drawing such as a diagram or a chart in ink input. As used herein, hand-drawn object means any handwritten non-character shape or drawing. A user may draw diagrams and flow charts freely without restrictions on the hand-drawn input. One shape may have many strokes and the input order of strokes may be arbitrary so that the system and method may accept any ink as input. As used herein, ink generally means a handwritten stroke or strokes. Moreover, the strokes could be over-traced or overlapped. For either case, the system and method may automatically detect the correct shapes.

In specific, the system and method may detect the hand-drawn shape of containers and connectors drawn between containers for shape recognition. As used herein, a container means any closed drawing object. As used herein, a connector means any drawing object joining containers. As will be understood, the various block diagrams, flow charts and scenarios described herein are only examples, and there are many other scenarios to which the present invention will apply.

Figure 2:
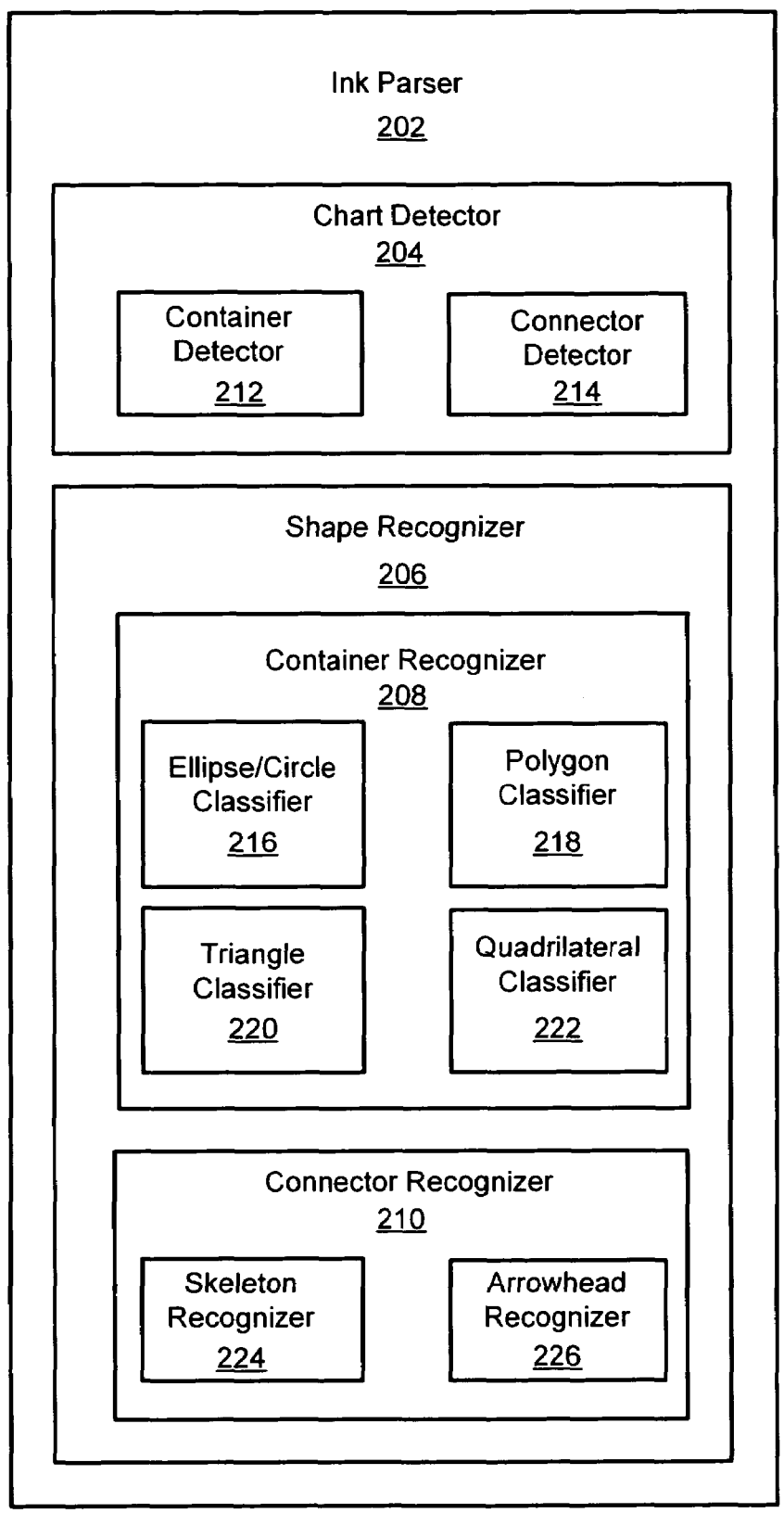
FIG. 2 is a block diagram generally representing an exemplary architecture of system components for detection of hand-drawn objects in ink input and shape recognition of hand-drawn objects, in accordance with an aspect of the present invention.

Turning to FIG. 2 of the drawings, there is shown a block diagram generally representing an exemplary architecture of system components for detection and shape recognition of hand-drawn objects. Those skilled in the art will appreciate that the functionality implemented within the blocks illustrated in the diagram may be implemented as separate components or the functionality of several or all of the blocks may be implemented within a single component. For example, the functionality for the chart detector 204 may be included in the shape recognizer 206. Or the functionality of the container detector 212 may be implemented as a separate component.

The ink parser 202 may accept any ink, including ink with a drawing object. The ink parser 202 may include an operably coupled chart detector 204 and an operably coupled shape recognizer 206. In general, the chart detector 204 and the shape recognizer 206 may be any type of executable software code such as a kernel component, an application program, a linked library, an object, and so forth. The chart detector 204 may include an operably coupled container detector 212 and an operably coupled connector detector 214, and the shape recognizer 206 may include an operably coupled container recognizer 208 and an operably coupled connector recognizer 210. The container recognizer 208 may include any number of operably coupled classifiers such as an ellipse/circle classifier 216, a polygon classifier 218, a triangle classifier 220, a quadrilateral classifier 222, and so forth. The connector recognizer 210 may include any number of operably coupled recognizers such as a skeleton recognizer 224, an arrowhead recognizer 226, and so forth. Each of these components may also be any type of executable software code such as a kernel component, an application program, a linked library, an object, or other type of executable software code.

Figure 3:
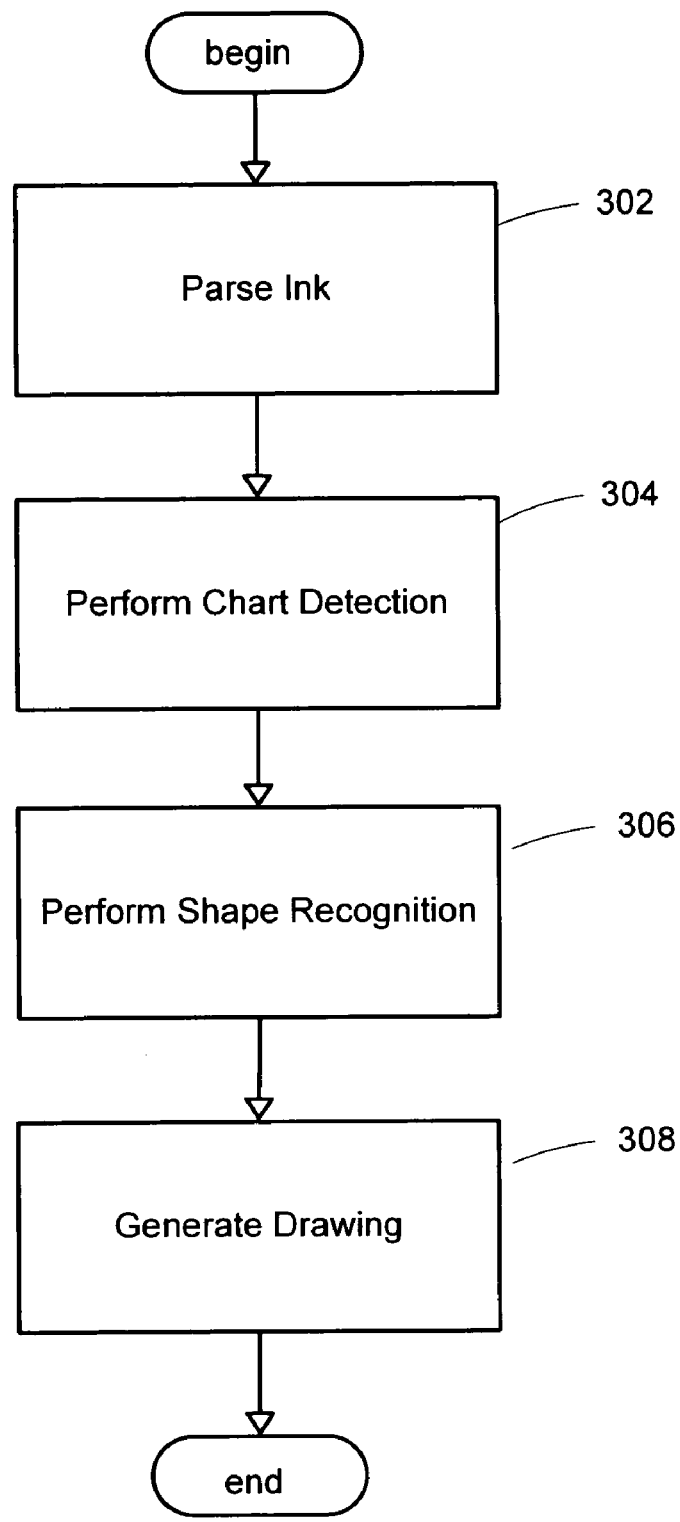
FIG. 3 is a flowchart generally representing the steps undertaken for detection of hand-drawn objects in ink input and shape recognition of hand-drawn objects, in accordance with an aspect of the present invention.

FIG. 3 presents a flowchart generally representing the steps undertaken for detection and shape recognition of hand-drawn objects. At step 302, any ink may be parsed, including ink with a drawing object. For instance, in one embodiment, a page of ink may be accepted as input and parsed. In this embodiment, the ink parser, for example, may have no a priori knowledge of the ink on the page. Therefore, fundamental algorithms such as word grouping, writing/drawing classification and drawing grouping may be executed. In order to perform word grouping, strokes may be grouped into hierarchies of words, lines, and blocks. To do so, the word grouping process may include feature extraction of strokes to captures distance, geometric dissimilarity and linearity, and other stroke features. The word grouping process may also include dynamic programming to group the strokes according to temporal information. The word grouping process may also include clustering to group the strokes according to spatial information. The words, lines and blocks identified in the groups may not necessarily correspond to real semantic words, lines and blocks. In fact, these groups may include strokes of hand-drawn objects.

To perform writing/drawing classification, various features may be identified that may differentiate writing from drawing. For instance, single word features such as curvature, density, and other handwriting model features, may be used to differentiate writing from drawing. In one embodiment, context features such as temporal and spatial context features, may be used to differentiate writing from drawing. Each of the various features may be mapped to a fuzzy function, and classification between writing and drawing may be determined according to a combination of the fuzzy functions.

After performing word grouping and writing/drawing classification, the drawing strokes may be well organized by performing drawing grouping. To perform drawing grouping, the drawing strokes may be grouped into independent objects according to the spatial relationship among them. An efficient grid-based approach may be used for fitting the ink strokes into an image grid with an appropriate size. The image grid may be labeled to find connected components. Each connected component may correspond to a drawing object. Heuristic rules may then be applied to adjust the drawing objects.

At step 304, chart detection may be performed to group drawing strokes by finding all the strokes that may belong to a drawing object. Thus a user can draw diagrams and flow charts freely without any restriction on the input. For instance, one shape may have many strokes and the input order may be arbitrary. Moreover, the strokes could be over-traced or overlapped. For any of these cases, the system may automatically detect the correct shapes. In one embodiment, a hypergraph may be used to represent the diagrams and flow chart so that the relationship between containers and connectors may be fully represented. Thus, connectors that may join more than two containers may be supported in this embodiment.

In one embodiment, the container detector 212 may find all the strokes that belong to a container and the connector detector 214 may find all the strokes that belong to a connector. To do so, an optimal search may be performed in time order to detect any containers. An efficient search may also be performed to detect containers and connectors. Finally, content detection may be performed for each detected container.

At step 306, shape recognition may be performed to recognize containers and connectors. After all of the strokes have been grouped for each container and each connector, the shape recognition engine 206, in one embodiment, may be used to recognize closed containers and unclosed connectors in a drawing such as diagram or chart. When recognized, the type, location, orientation and size of the shape can be provided. Advantageously, the order of stroke input and the number of strokes do not affect the recognition. When shape recognition has been performed to recognize the closed containers and unclosed connectors, the drawing may be generated at step 308.

Figure 4:
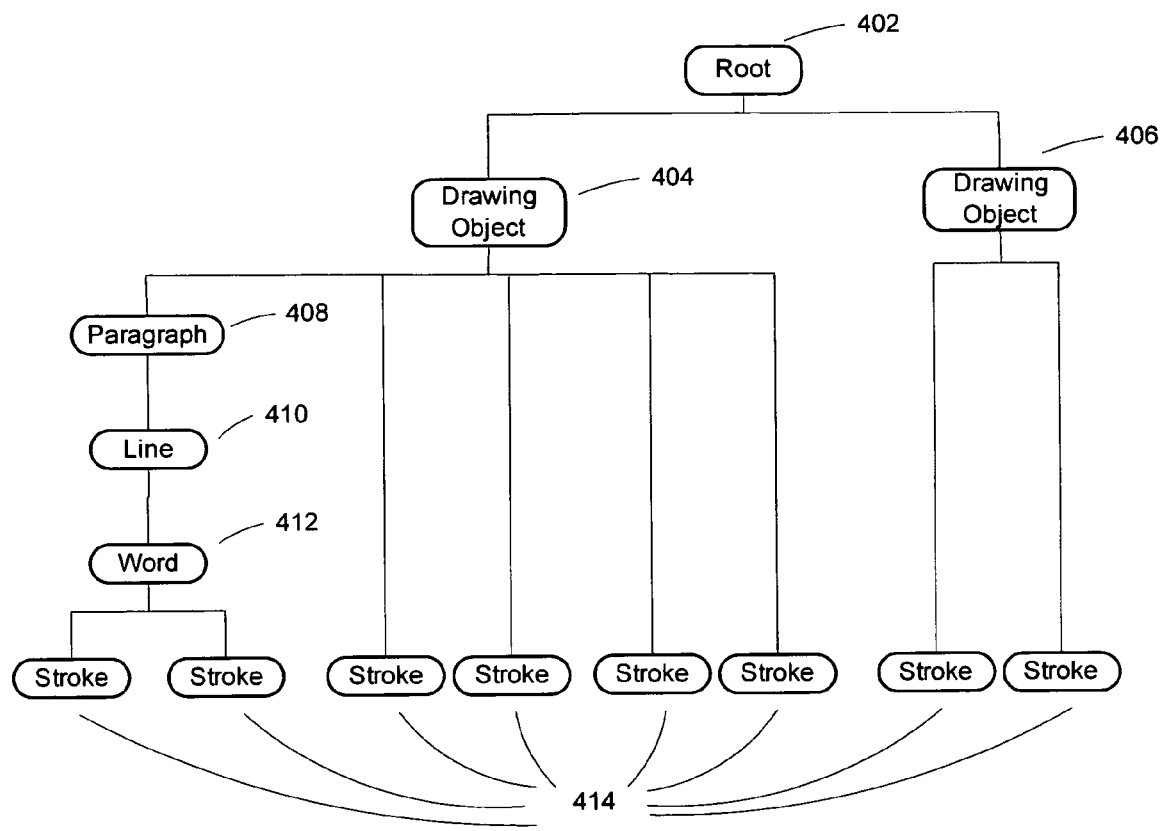
FIG. 4 is an exemplary illustration generally representing a structural relationship of handwritten objects in ink input for use in performing detection and shape recognition of hand-drawn objects, in accordance with an aspect of the present invention.

FIG. 4 presents an exemplary illustration generally representing a structural relationship of handwritten objects in ink input for use in performing detection and shape recognition of hand-drawn objects. Root 402 may represent ink input, such as a page of ink input, that may include one or more drawing objects such as drawing objects 404 and 406. Drawing object 404 may have associated content such as text which may be structurally represented by paragraph 408 that may be made of line 410 which has a word 412 formed by strokes 414. Drawing objects 404 and 406 may be detected and recognized by performing detection and shape recognition of the hand-drawn objects within the ink input.

Figure 5A:
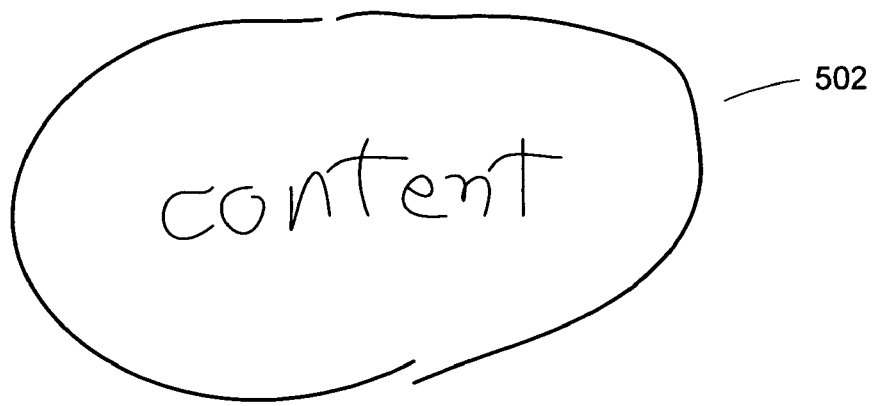
FIGS. 5A-5C are exemplary illustrations generally representing types of containers in ink input supported for detection and shape recognition of hand-drawn objects, in accordance with an aspect of the present invention.
Figure 5B:
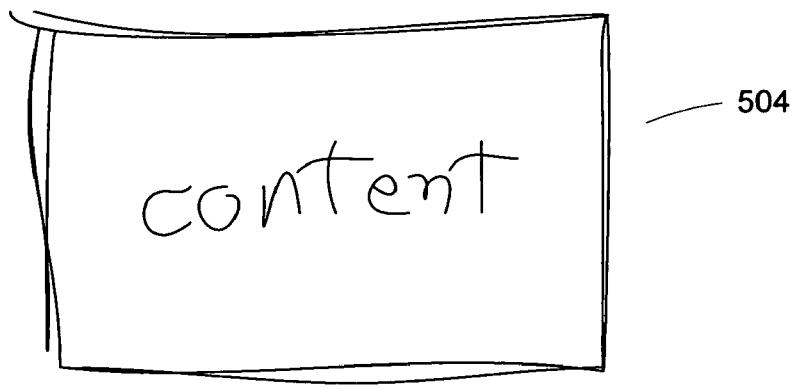
Figure 5C:
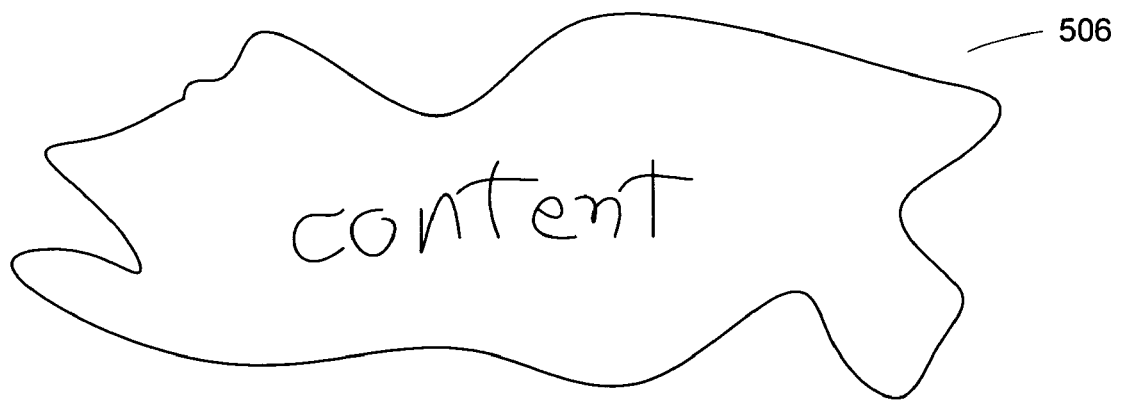
Figure 6A:
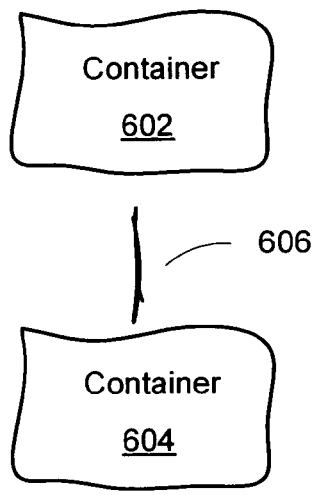
FIGS. 6A-6D are exemplary illustrations generally representing types of connectors in ink input supported for detection and shape recognition of hand-drawn objects, in accordance with an aspect of the present invention.
Figure 6B:
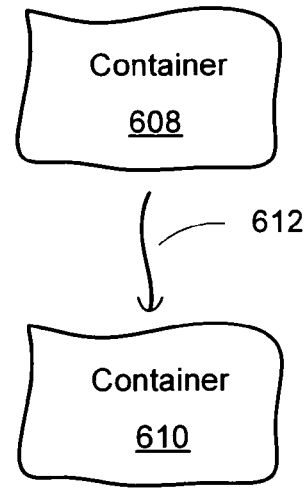
Figure 6C:
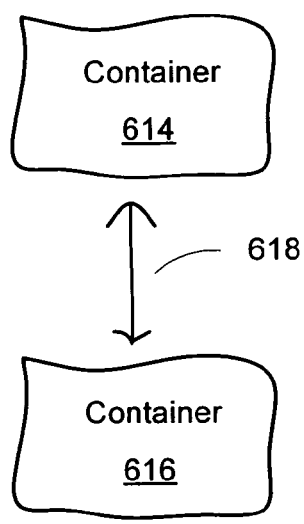
Figure 6D:
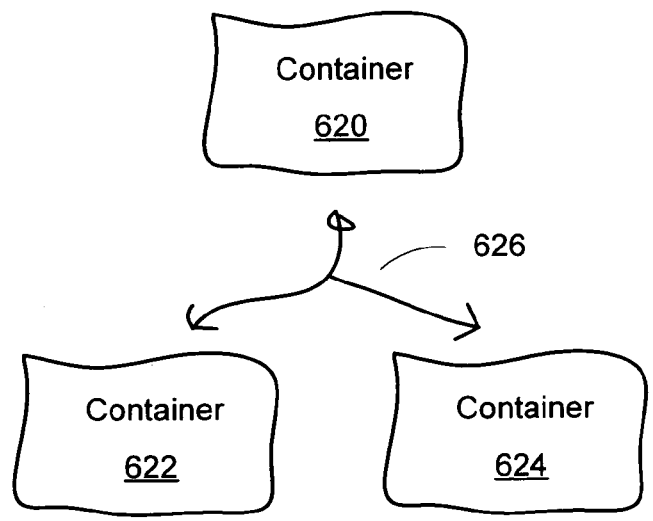

The hand-drawn objects may be a drawing such as a diagram or a chart typically including containers and connectors. FIGS. 5A-5C provide exemplary illustrations generally representing types of containers in ink input supported for detection and shape recognition of hand-drawn objects. Supported containers that may be detected and recognized may be any type of container that may form an enclosed area. Examples of such containers are container 502 in FIG. 5A, container 504 in FIG. 5B, and container 506 in FIG. 5C. Content, such as text, may be included within the enclosed area of the container. FIGS. 6A-6D provide exemplary illustrations generally representing types of connectors in ink input supported for detection and shape recognition of hand-drawn objects. Supported connectors that may be detected and recognized may be any type of connector joining two or more containers. Such a connector may include no arrows such as connector 606 in FIG. 6A, one arrow such as connector 612 in FIG. 6B, two arrows such as connector 618 in FIG. 6C, or three arrows such as connector 626 in FIG. 6D. A connector may include as many arrows as there are containers that it joins.

Figure 7:
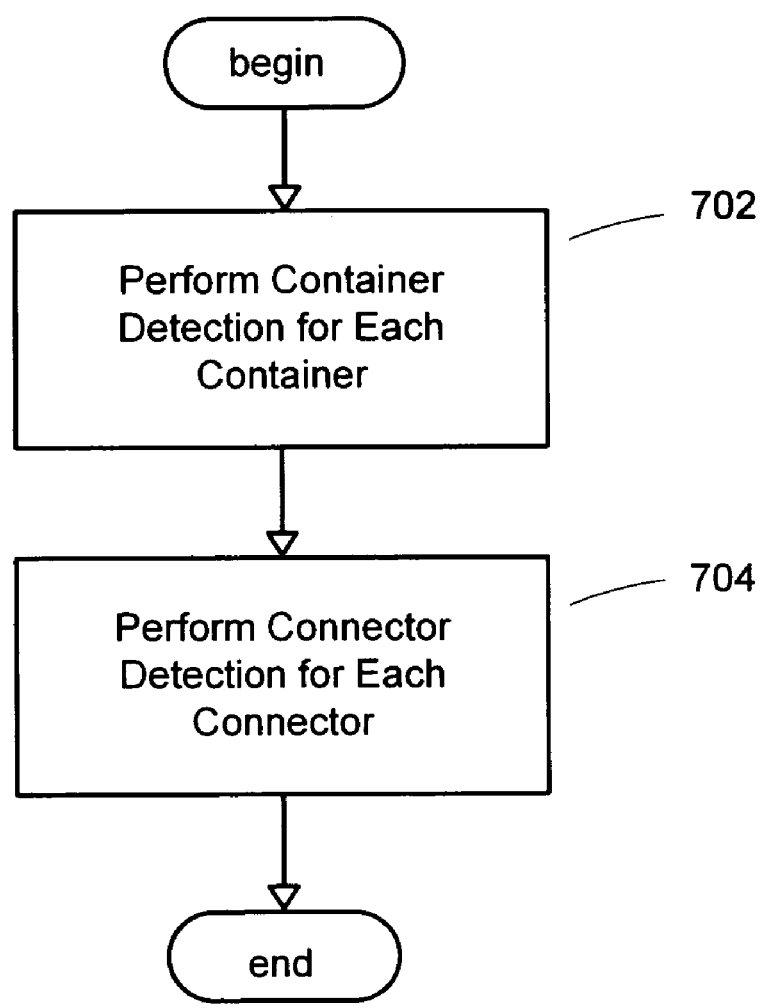
FIG. 7 is a flowchart generally representing one embodiment of the steps undertaken for detection of containers and connectors in ink input, in accordance with an aspect of the present invention.

FIG. 7 presents a flowchart generally representing one embodiment of the steps undertaken for detection of charts with containers and connectors. Container detection may be performed at step 702 for each container in the drawing object. Then, connector detection may be performed for each connector in the drawing object at step 704. In general, the containers in a drawing object may be considered as islands in a two-dimensional plane with the connectors forming bridges between them. In one embodiment, the strokes of the drawing object may be positioned on an image grid and a flood fill algorithm may be used to detect the containers and connectors.

Figure 8:
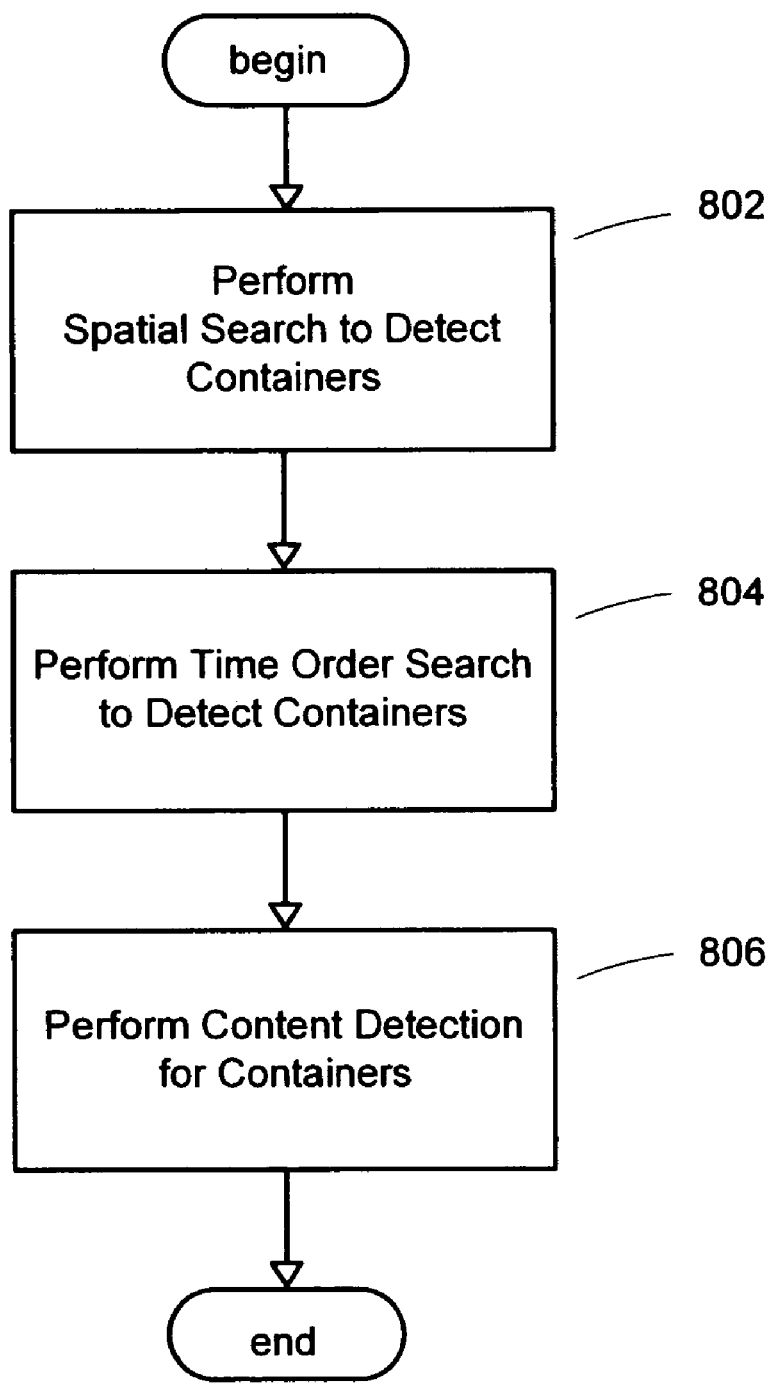
FIG. 8 is a flowchart generally representing an embodiment of the steps undertaken for detection of containers in ink input, in accordance with an aspect of the present invention.

FIG. 8 presents a flowchart generally representing an embodiment of the steps undertaken for detection of containers in ink input. At step 802 a spatial search may be performed to detect the containers. Advantageously, a spatial search may handle arbitrary input of strokes and overtracing of strokes. Because a time order search is better suited to handle overlapping of strokes, a time order search may also be performed at step 804 to detect containers drawn with consecutive strokes that overlap. Any additional containers found by performing a time order search may be marked in the image grid used for the spatial search, so that all found containers may be included in the image grid for later use during content detection and connector detection. At step 806, content detection may be performed for any container. In this step, it may be determined whether any content, such as a recognized word, may belong to a container by calculating the intersection area of its bounding box with each container.

Figure 9:
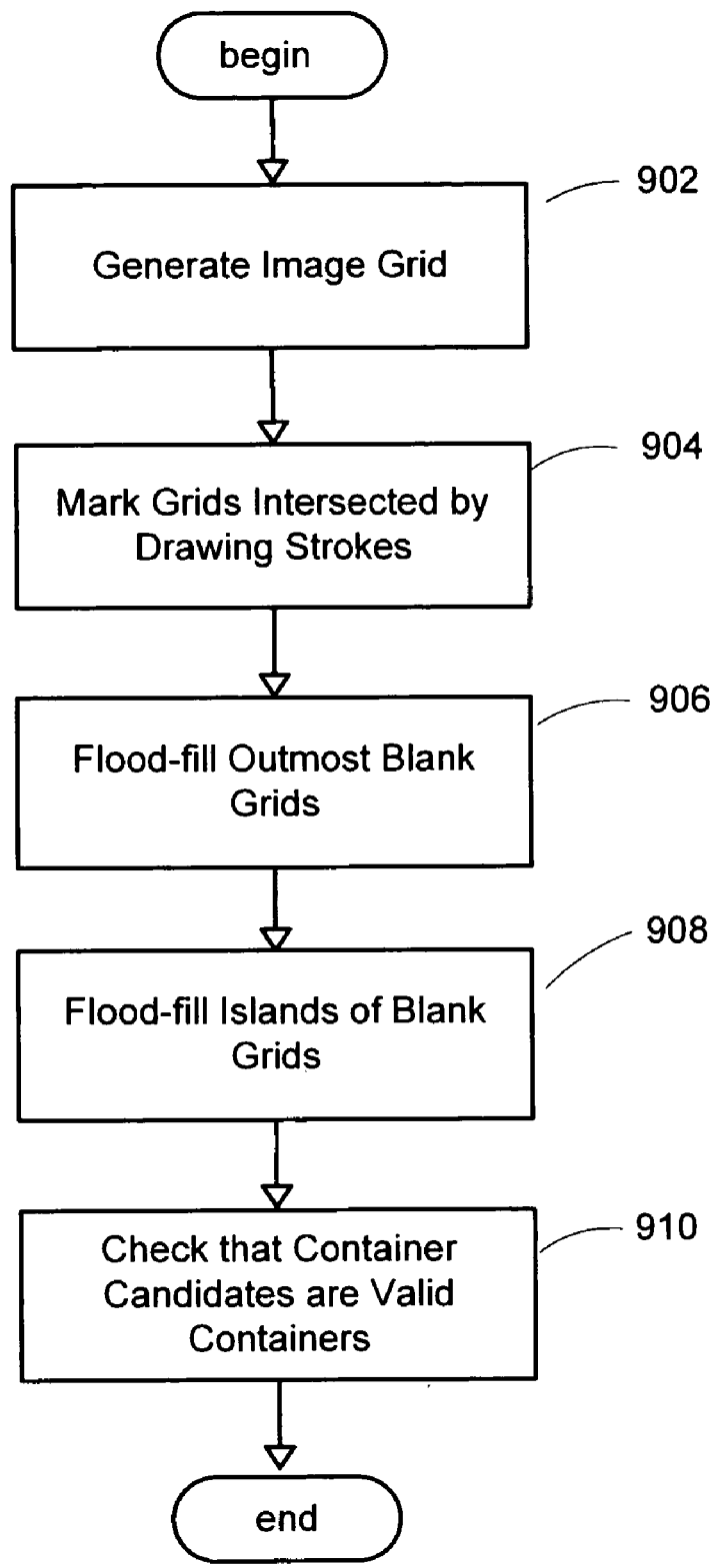
FIG. 9 is a flowchart generally representing an embodiment of the steps undertaken for performing a spatial search to detect containers, in accordance with an aspect of the present invention.

FIG. 9 presents a flowchart generally representing an embodiment of the steps undertaken for performing a spatial search to detect containers. At step 902, an image grid may be generated and the strokes of the drawing object may be positioned on the generated grid. In one embodiment, the grid size may be set at an appropriate value to eliminate the gaps between container strokes but still leave a hollow area in the interiors of the containers. To select an appropriate value, the grid size may be empirically determined by checking test data to ensure that as many containers as possible could be detected. As a result of such a determination, the grid size may be set at 2.5 mm. The grids that intersect with a drawing stroke may be marked at step 904.

Figure 10A:
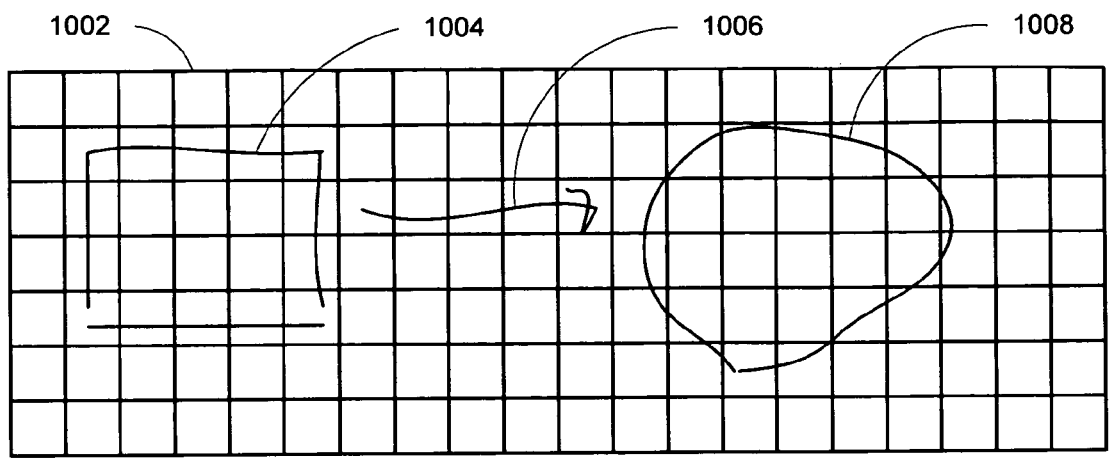
FIGS. 10A-10C are exemplary illustrations generally representing a depiction of containers in an image grid during various steps of a spatial search, in accordance with an aspect of the present invention.

In order to check which grids intersect the drawing strokes, the drawing strokes may be re-sampled according to a uniform stepsize and the position where the re-sampled points are located in the image grid may be checked. As illustrated in FIG. 10A, the grids that intersect the drawing strokes of containers 1004, connector 1006 and container 1008 are marked in image grid 1002. The containers 1004 and 1008 become 8-neighbourhood connected areas in the image grid 1002.

Figure 10B:
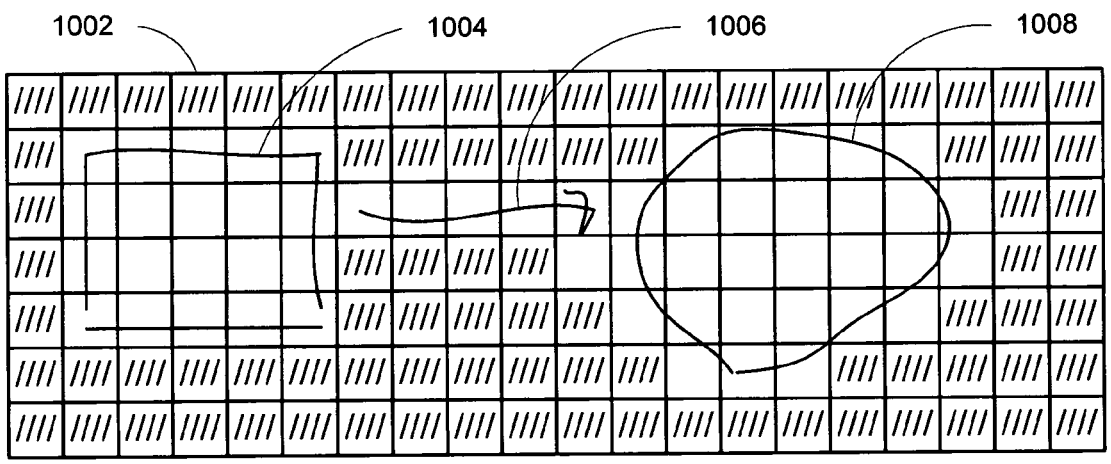
Figure 10C:
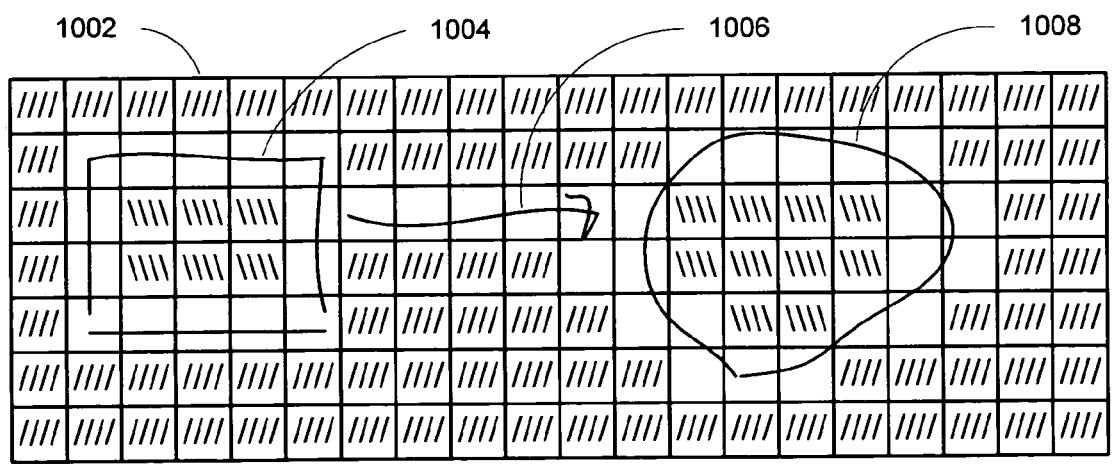

Beginning with the exterior edges of the image grid, the outmost blank grids may be flood-filled at step 906 until reaching the marked grids that intersect with drawing strokes. As illustrated in FIG. 10B, containers 1004 and 1008 may appear as islands of blank grids in image grid 1002. At step 908, the islands of blank grids may be flood-filled. For each island, one inside blank grid may be chosen as a starting grid from which all adjacent blank grids may be flood-filled until reaching the border formed by grids intersecting some strokes. When the border of an island is reached, the strokes that form a container candidate are recorded. For example, FIG. 10C illustrates the islands of containers 1004 and 1008 as flood-filled. The borders around the flood-filled islands intersect the drawing strokes of these candidate containers.

Figure 11A:
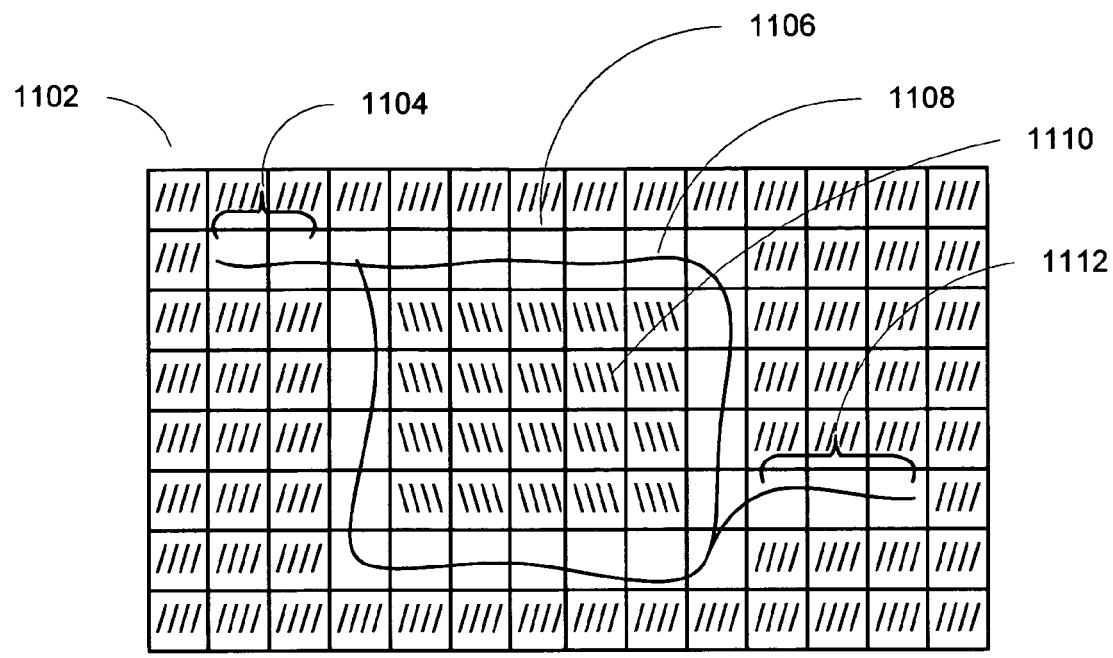
FIGS. 11A-11C are exemplary illustrations generally representing a depiction of containers that are candidates for validation in an image grid during a spatial search, in accordance with an aspect of the present invention.

The step of flood-filling the islands of blank grids may result in identifying candidate containers that may not be valid containers. Therefore, candidate containers may be checked to confirm that they are valid containers at step 910. The drawing strokes of each candidate container may have strokes that are outside of the border grids of a flood-filled island. For example, FIG. 11A illustrates an image grid 1102 with a candidate container 1108 that has strokes 1104 and 1112 that are outside the border grids 1106 surrounding the flood-filled island 1110. For all the grids which intersect one stroke of the candidate container, the grids that are adjacent to a flood-filled island grid may be defined as valid and others may be defined as invalid. If the ratio of invalid grids to valid grids is greater than an empirical value, such as 0.2, the corresponding stroke may be defined as invalid. Such invalid strokes may be removed. For example, strokes 1104 and 1112 in FIG. 11A are invalid strokes. After removing all invalid strokes, the container candidate is valid if it is still closed (i.e., forms an enclosed area.) To determine whether the container is still closed, the same steps used for container detection in FIG. 9 may be used. That is, the island of blank grids of the container candidate may be flood-filled, and if some blank grids outside of the island may be reached, the container candidate may be determined to be no-longer closed.

Figure 11B:
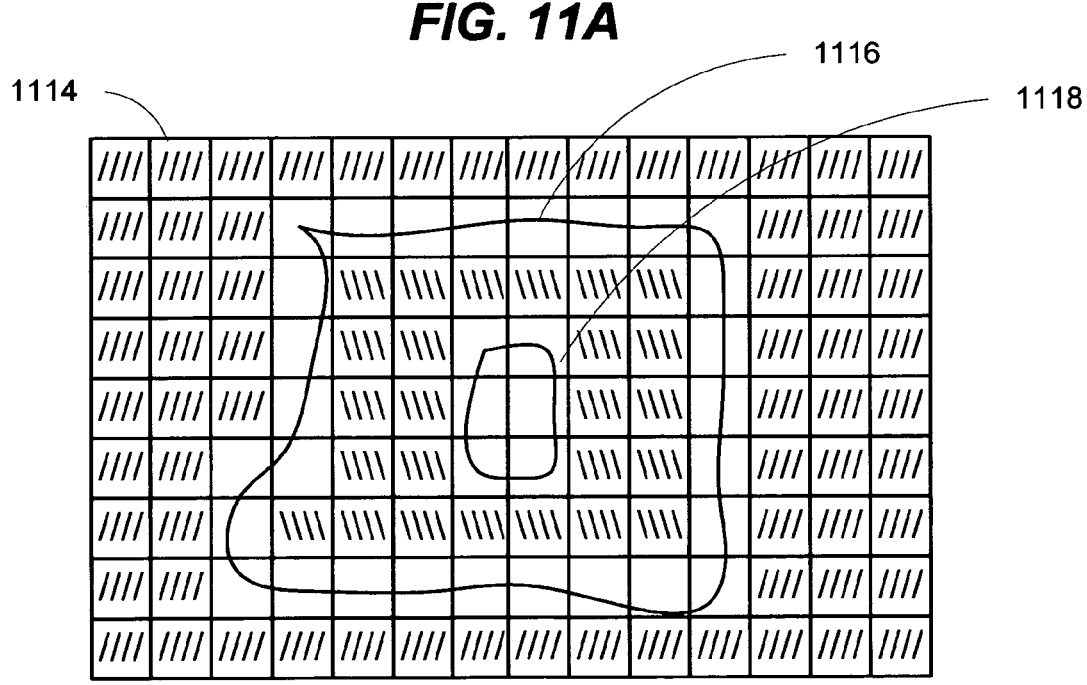
Figure 11C:
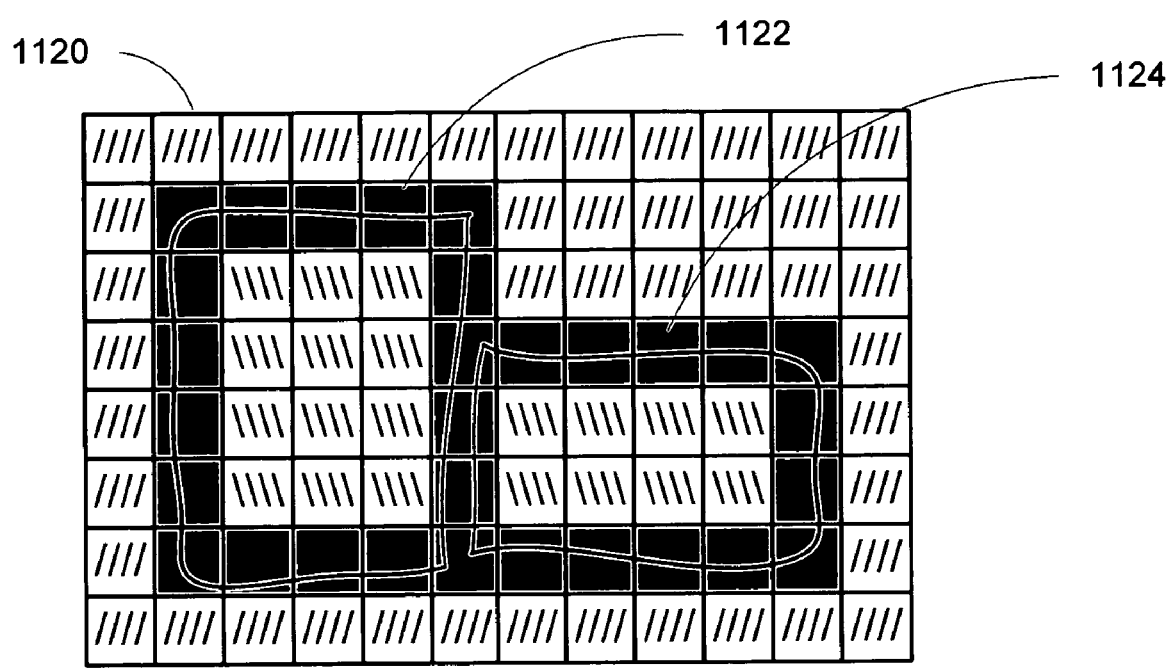

A valid closed container may include other drawing strokes such as inner drawing strokes or may share drawing strokes with another container candidate. In the case that the valid container includes inner drawing strokes, the inner drawing strokes may be treated in one embodiment as content of that container as illustrated in FIG. 11B. Container 1116 in image grid 1114 includes inner drawing strokes 1118 which may be treated as content of container 1116. In the case where a container candidate shares drawing strokes with another container candidate, the shared strokes may be separated in one embodiment and determined to belong to one of the candidate containers. For example, FIG. 11C illustrates container candidates 1122 and 1124 in image grid 1120 where part of the valid borders is shared by each container candidate. There are two drawing strokes that intersect the grids of the shared portion of the border. For each stroke in the shared portion of the border, the points of the drawing stroke are re-sampled and the average distance to the center of each candidate container is computed. The drawing stroke is assigned as belonging to the candidate container with the shortest average distance to its center. If the other candidate container is no longer closed as a result of losing the drawing stroke, it may become an invalid candidate container. However, as illustrated in FIG. 11C, the two drawing strokes intersecting the shared portion of the valid border of container candidates 1122 and 1124 may each be respectively assigned as belonging to the container candidate with the shortest average distance to its center. Both container candidates may remain closed and still be valid since each is assigned one of the two drawing strokes.

Figure 12:
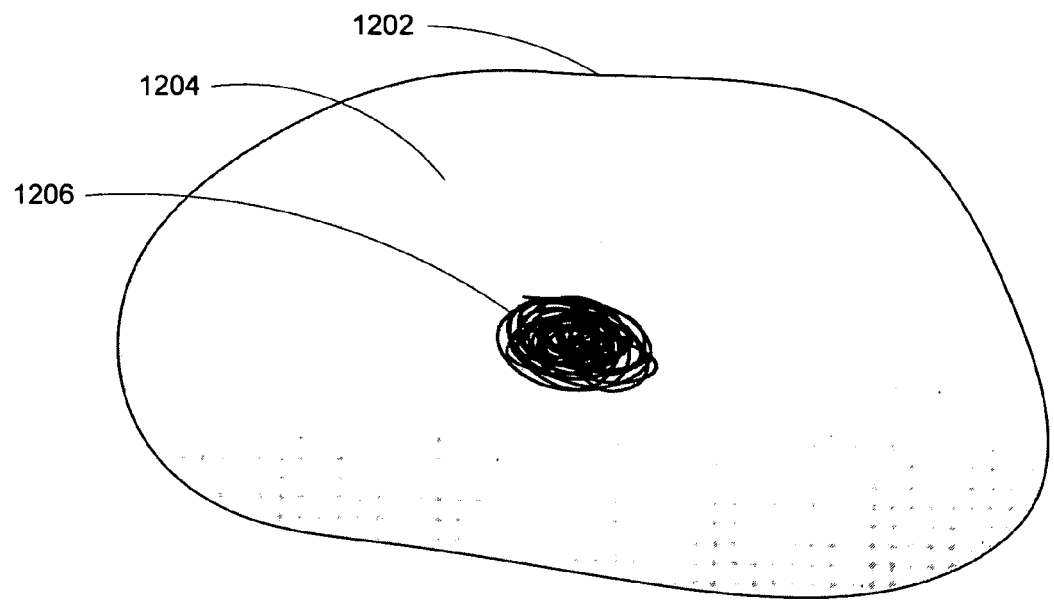
FIG. 12 is an exemplary illustration generally representing a depiction of a valid region area of a candidate container, in accordance with an aspect of the present invention.
Figure 13:
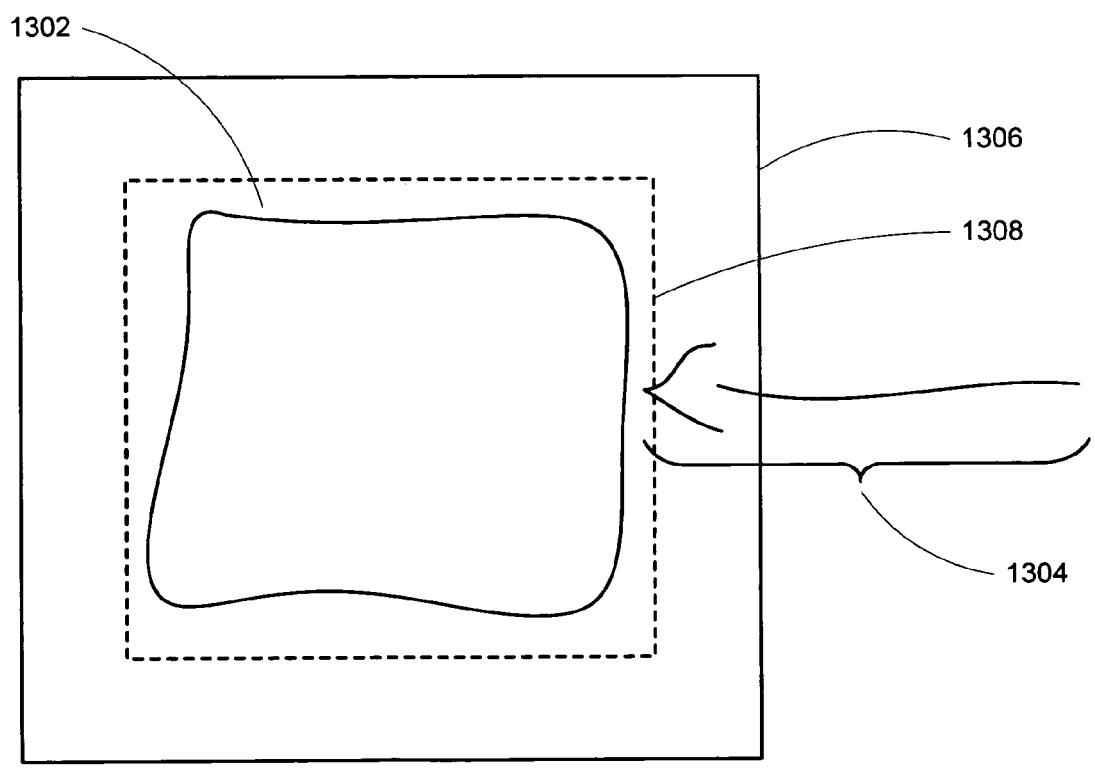
FIG. 13 is an exemplary illustration generally representing a depiction of grouping the number of strokes of a candidate container, in accordance with an aspect of the present invention.

In one embodiment, a time order search may also be performed after a spatial search because a time order search may be better suited to handle overlapping of strokes. In general, containers formed from a sequence of consecutive strokes may be found using a time order search by determining the likelihood that a sequence of input strokes forms a container. In this embodiment, p(i,j) may represent the likelihood that (i,j), an input stroke sequence from i to j, may be a container. p(i,j) may be defined as:

$$p(i,j) = \begin{cases} w_1 v_b(i,j) + w_2 v_a(i,j) + w_3 \frac{1}{s(i,j)} & (v_b > V_B, v_a > V_A) \\ 0 & \text{otherwise} \end{cases}$$

where $v_b$ is the valid border ratio; $v_a$ is the valid area ratio; s(i,j) is the number of strokes; $w_1$, $w_2$, $w_3$ are the weights; $V_B$ and $V_A$ are the thresholds for $v_b$ and $v_a$, respectively. A valid border ratio may be defined as: $v_b$=valid border length/total border length. An invalid region area of a container candidate may be defined as the region that intersects some inner drawing strokes that do not belong to the container candidate, and the valid region area may be defined as the area within the container candidate less any invalid region areas. A valid area ratio may be defined as: $v_a$=valid region area/total area. FIG. 12 presents an exemplary illustration of a valid region area 1204 of a candidate container 1202 that includes an invalid region area that intersects inner drawing strokes 1206. Those skilled in the art will appreciate that the features of valid border length, total border length, valid region area and total area may be determined using an image grid with the same process used for identifying the borders of candidate containers during the spatial search as previously described in reference to FIG. 9. Empirical values may be used for $V_B$ and $V_A$, such as 0.15 and 0.25, and empirical values 0.4, 0.4, and 0.2 may be used for weights $w_1$, $w_2$, $w_3$. The number of strokes, s(i,j), may be defined as: s(i,j)=j−i+1. The feature of a number of strokes may be used to prevent the mis-grouping of any small strokes near the container, as illustrated in the FIG. 13. The number of strokes used to form container 1302 may be determined for surrounding region 1308 and distinguished from the number of strokes found in region 1306 which form container 1302 and part of connector 1304.

Figure 14:
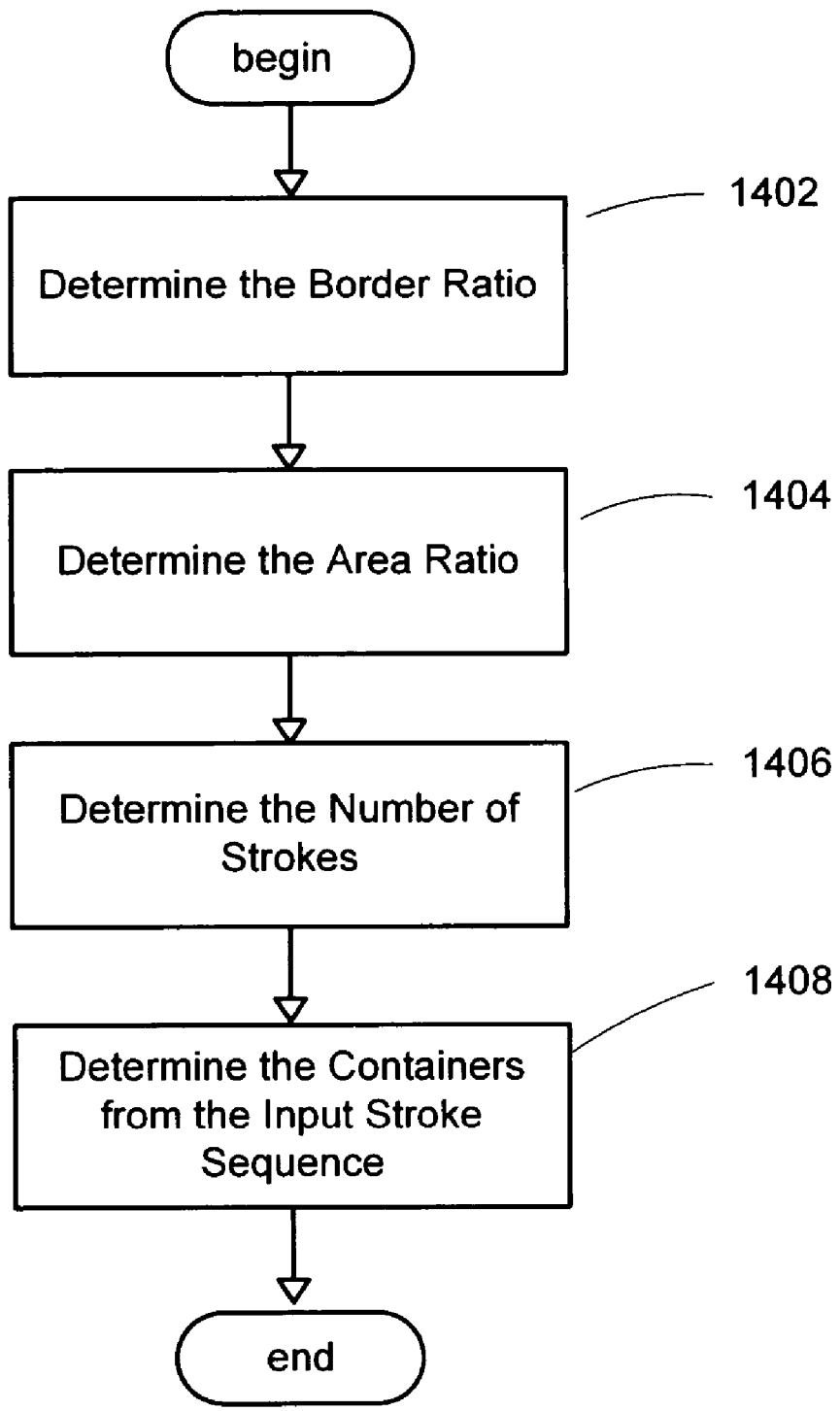
FIG. 14 is a flowchart generally representing an embodiment of the steps undertaken for performing a time order search, in accordance with an aspect of the present invention.

FIG. 14 presents a flowchart generally representing an embodiment of the steps undertaken for performing a time order search. At step 1402, a valid border ratio, $v_b$, may be determined. At step 1404, a valid area ratio, $v_a$, may be determined. At step 1406, the number of strokes, s(i,j), may be determined. At step 1408, containers may be determined from the input stroke sequence. In one embodiment, the containers may be found in the input stroke sequence (m,n) by solving P(m,n). For segmentation of the input stroke sequence (m,n) into k subsequences, $i_1,i_2,\Lambda,i_k$, P(m,n) may be defined as:

$$P(m,n)=\max(p(m,i_1)+p(i_1+1,i_2)+\Lambda+p(i_k+1,n))$$

The input strokes may be grouped into correct containers by calculating P(m,n). In one embodiment, dynamic programming may be used to calculate P(m,n), where P(m,n) may be expressed as a recursive procedure defined as:

$$\begin{cases} P(x,x) = p(x,x) \\ P(x,y) = \max(\{p(x,k) + P(k+1,y) \mid x \leq k < y\} \cup \{p(x,y)\}) \end{cases}$$

Any additional containers found by performing a time order search may be marked in the image grid used for the spatial search, so that all found containers may be included in the image grid for later use during content detection and connector detection.

Figure 15:
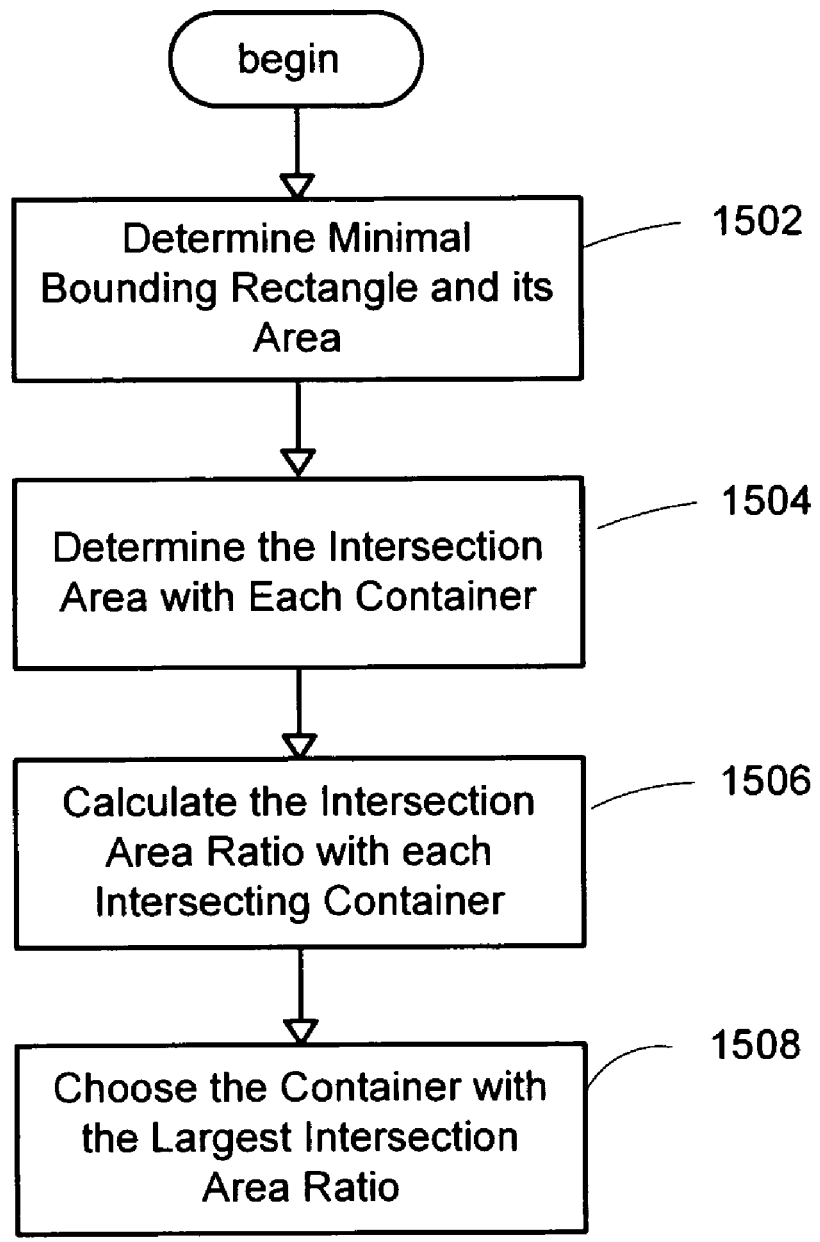
FIG. 15 is a flowchart generally representing an embodiment of the steps undertaken for performing content detection of a container, in accordance with an aspect of the present invention.
Figure 16:
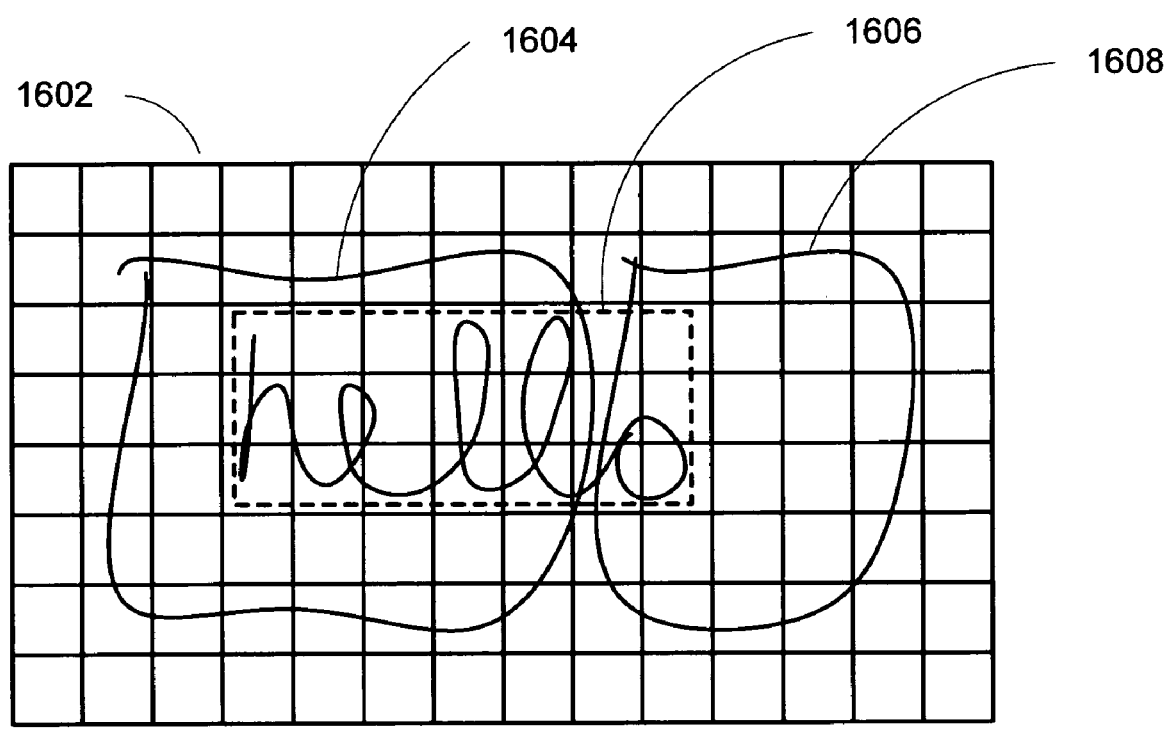
FIG. 16 is an exemplary illustration generally representing detection of container content, in accordance with an aspect of the present invention.

After performing a spatial search and a time order search to detect containers, content detection may be performed in the image grid for any content, such as a recognized word, that may belong to a container. For example, a written word may be checked whether it belongs to a container by calculating the intersection area of its bounding box and the border grids of a container. FIG. 15 presents a flowchart generally representing an embodiment of the steps undertaken for performing content detection of a container. At step 1502, a minimum bounding rectangle and its area may be determined for any text identified in the image grid. At step 1504, the intersection area of the minimum bounding rectangle with each container may be determined. At step 1506, the ratio of the intersection area and the area of the minimum bounding rectangle may be calculated. The container with the largest intersection ratio may be chosen as the container to which the content belongs at step 1508. For example, FIG. 16 illustrates a bounding rectangle 1606 surrounding the word "hello" in image grid 1602. The word, "hello", may be determined to belong to container 1604 because the intersection ratio with container 1604 is larger than the intersection ratio with container 1608. In one embodiment, the intersection ratio may also be required to be greater than an empirical threshold, such as 0.55.

Figure 17:
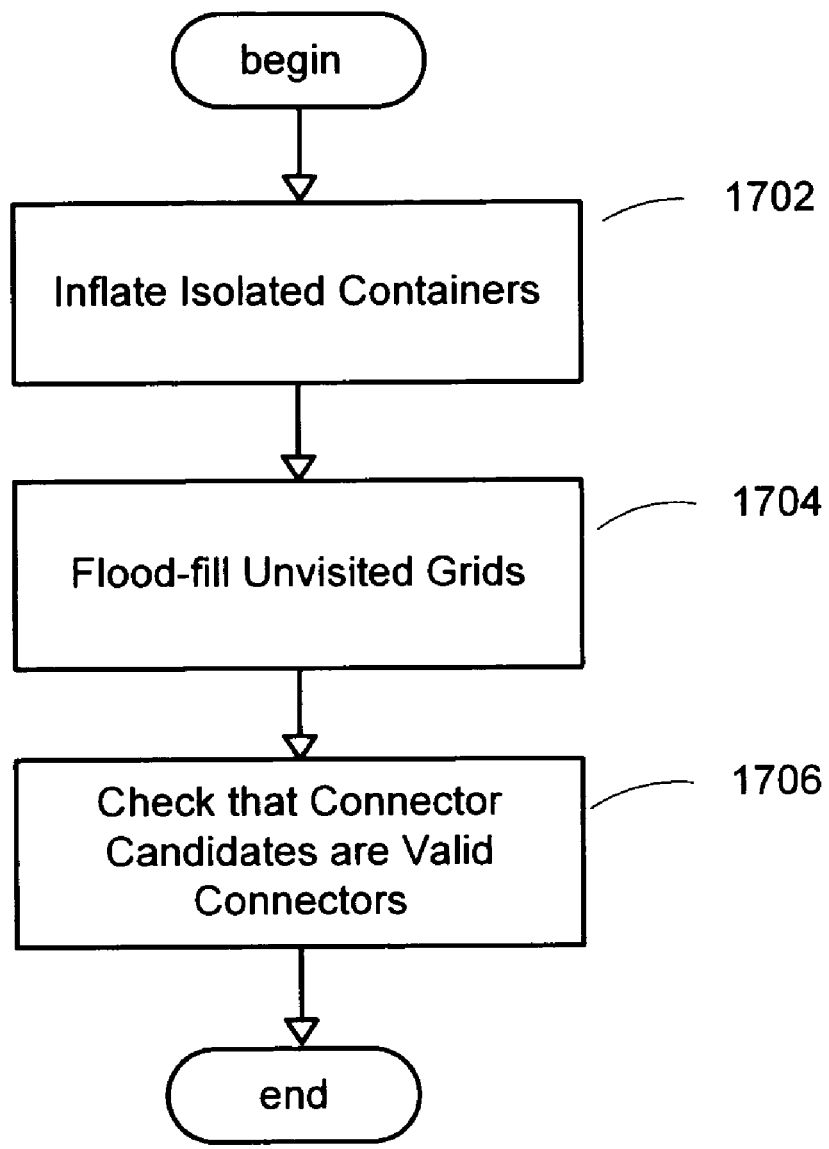
FIG. 17 is a flowchart generally representing an embodiment of the steps undertaken for detection of connectors in ink input, in accordance with an aspect of the present invention.
Figure 18A:
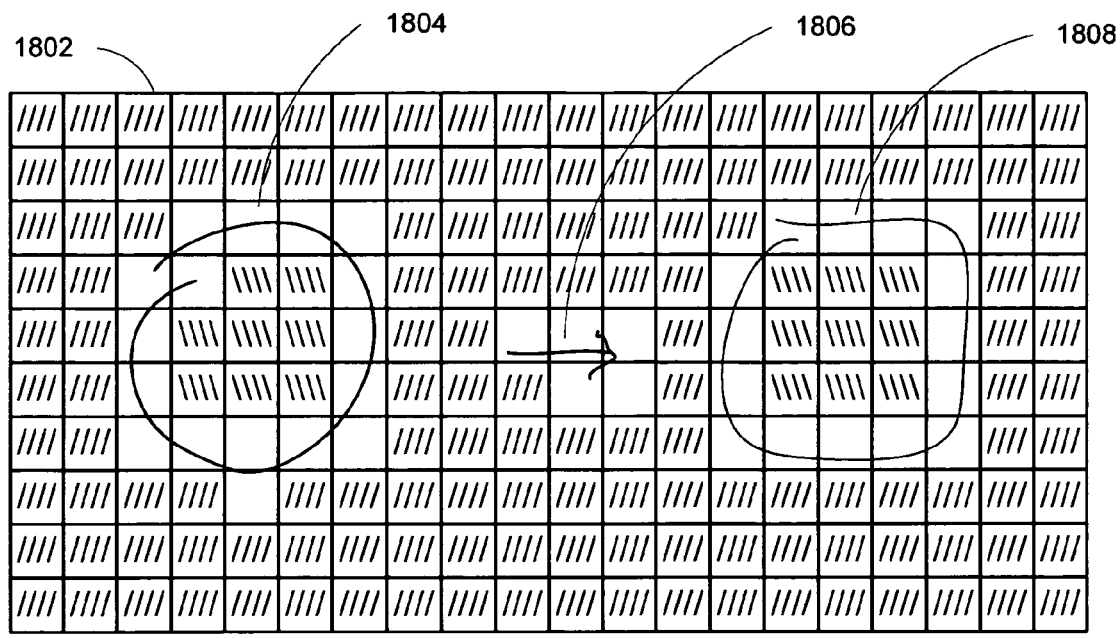
FIGS. 18A-18B are exemplary illustrations generally representing a depiction of detection of a connector in an image grid, in accordance with an aspect of the present invention.
Figure 18B:
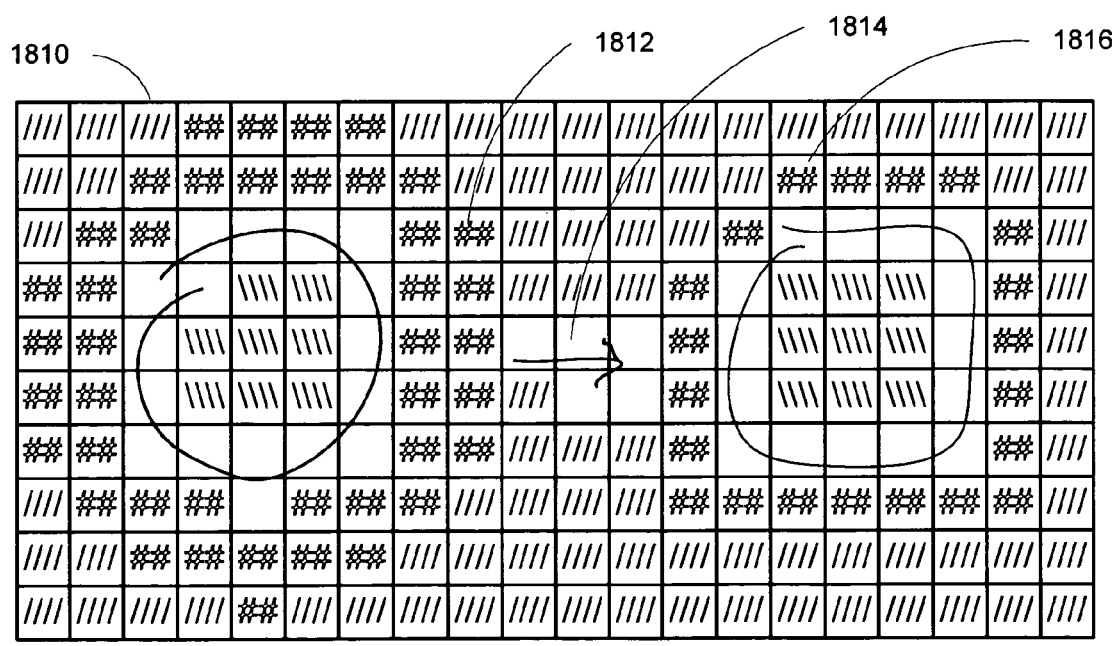

Once any containers and their associated content have been detected in the image grid, connector detection may be performed. FIG. 17 presents a flowchart generally representing an embodiment of the steps undertaken for detection of connectors in ink input. In general, a search may be performed in the image grid that has been marked with containers to detect any connectors among the grids of the unvisited drawing strokes that include all the non-container strokes. Because some users may tend to draw small connectors that may be far away from the containers, the containers may be inflated so that the connectors may be adjacent to the corresponding containers. FIG. 18A illustrates an image grid 1802 that has flood-filled grids between the unvisited grids intersecting with connector 1806 and the marked borders of containers 1804 and 1808. To detect such a connector, isolated containers that are not adjacent with the unvisited drawing strokes may be inflated with marked grids surrounding the border of the containers at step 1702. The inflation process may be stopped when either an unvisited grid or another container is reached. In this way, the connectors may be adjacent to the corresponding inflated containers, as illustrated in FIG. 18B. The containers shown in image grid 1810 of FIG. 18B have their borders surrounded with marked grids to create inflated containers 1812 and 1816. As a result, the grids intersecting the unvisited drawing strokes of connector 1814 may now be adjacent to the grids of the inflated containers.

Figure 19A:
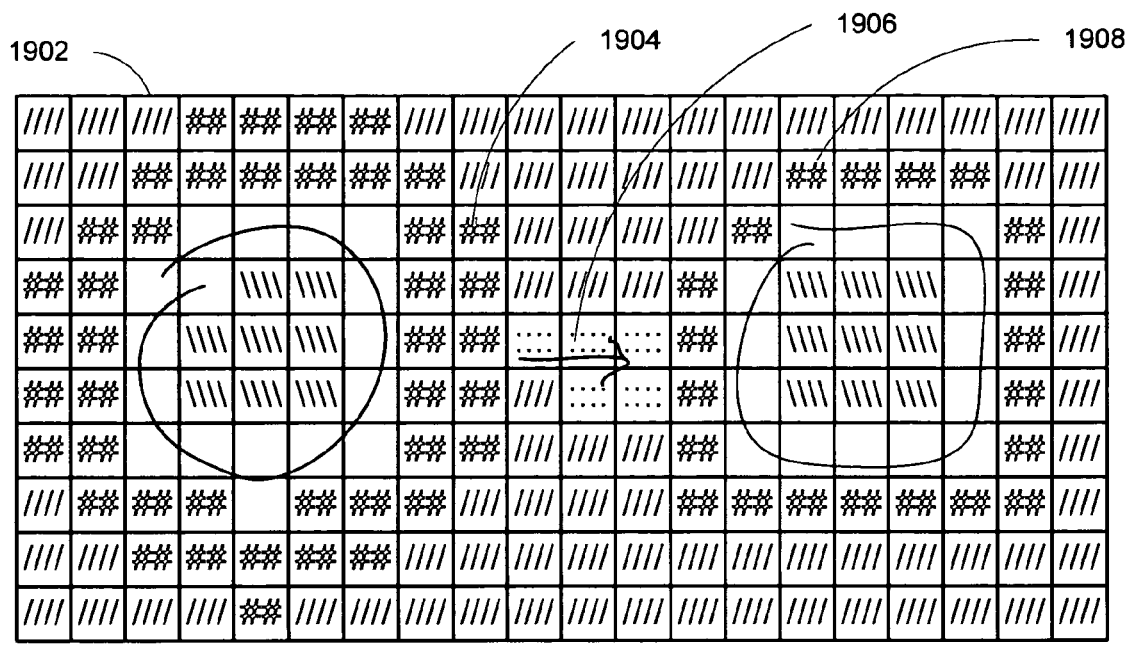
FIGS. 19A-19B are exemplary illustrations generally representing a depiction of connector candidates in an image grid, in accordance with an aspect of the present invention.
Figure 19B:
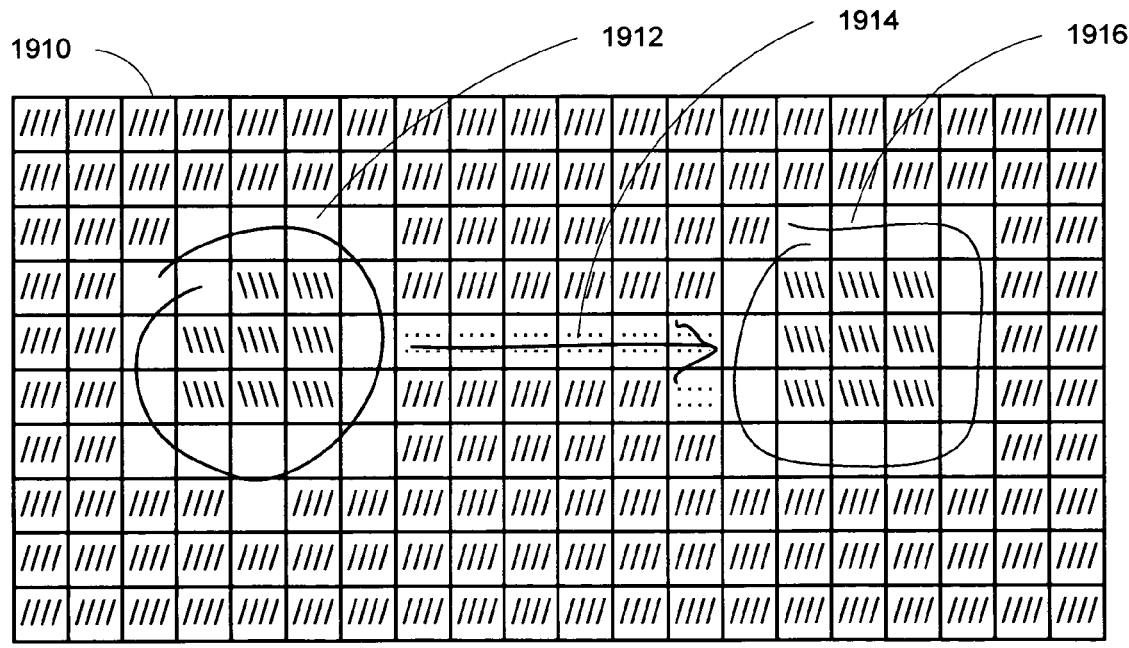

At step 1704 of FIG. 17, unvisited grids may be flood-filled. One unvisited grid may be chosen as a starting grid from which all adjacent unvisited grids may be flood-filled. If those flood-filled grids reach two or more containers, including inflated containers, then the corresponding drawing strokes are recorded as one connector candidate. As illustrated in image grid 1902 of FIG. 19A, the flood-filled grids between inflated containers 1904 and 1908 form a connector candidate 1906. In one embodiment, the borders of the containers in an image grid may already be adjacent with the unvisited drawing strokes that form a connector. In this case, the unvisited grids may be flood-filled without first inflating the containers. FIG. 19B illustrates this case in image grid 1910 where flood-filled grids may form a connector candidate 1914 between containers 1912 and 1916 without inflation.

Figure 20A:
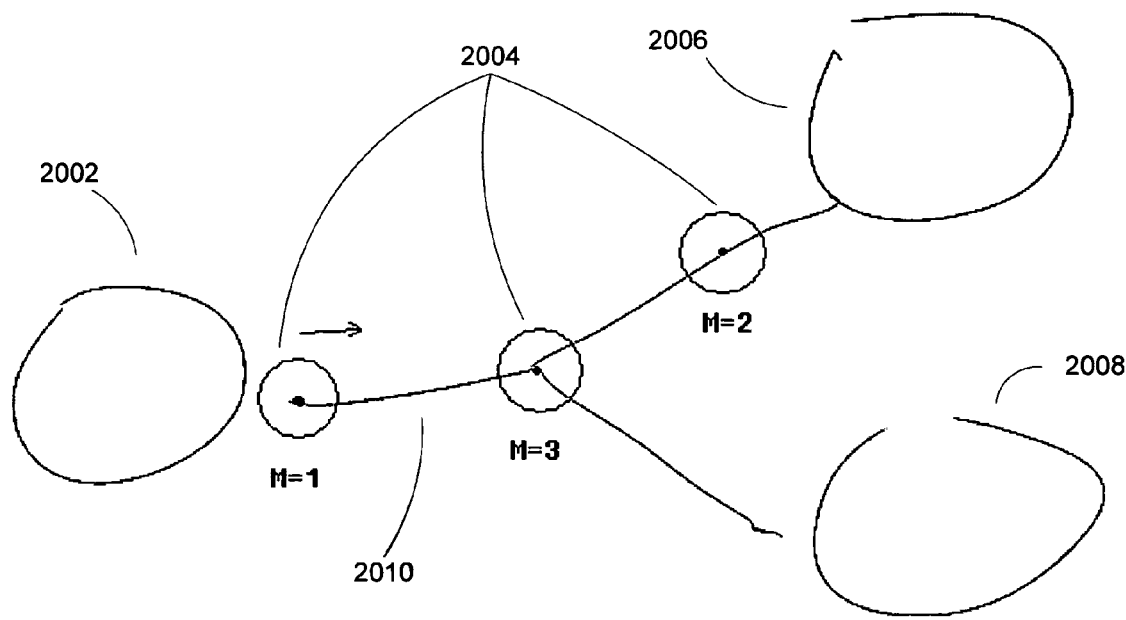
FIGS. 20A-20C are exemplary illustrations generally representing a depiction of valid and invalid connector candidates, in accordance with an aspect of the present invention.
Figure 20B:
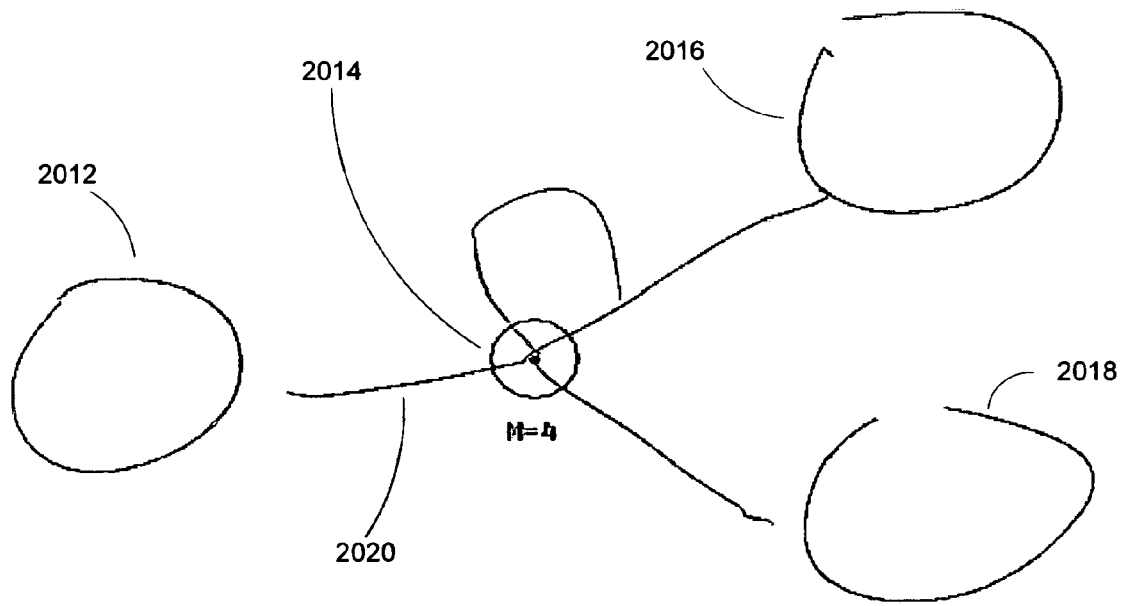
Figure 20C:
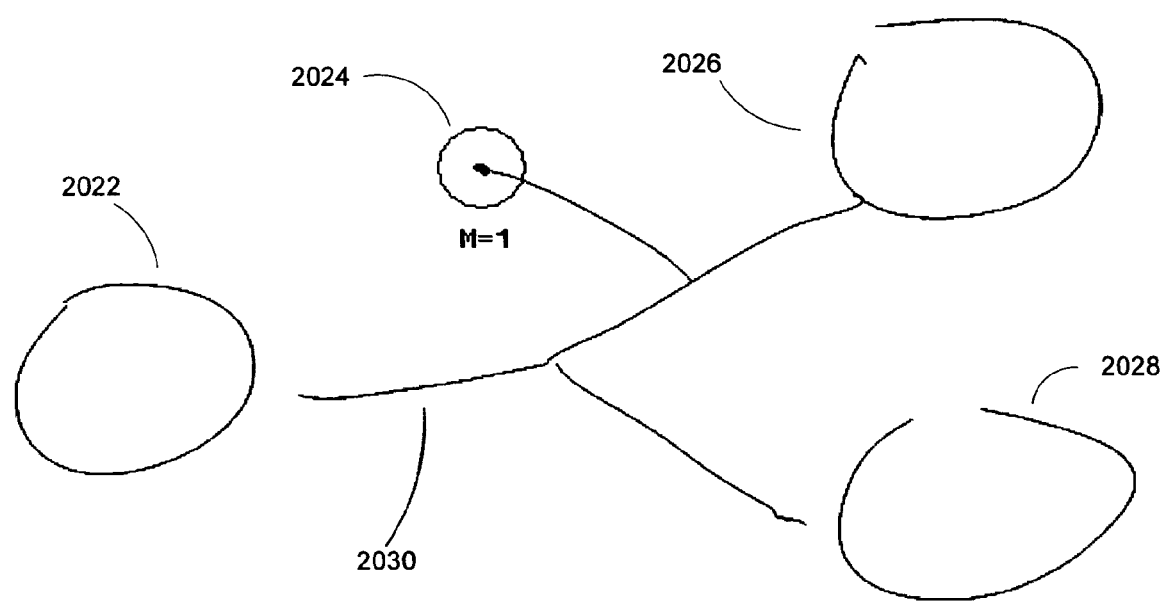

The step of flood-filling the unvisited grids of drawing strokes may result in identifying candidate connectors that may not be valid connectors. Therefore, candidate connectors may be checked to confirm that they are valid connectors at step 1706. A candidate connector may be invalid if the candidate connector has drawing strokes that do not connect to a container. In one embodiment to detect that there may be drawing strokes of the candidate connector that do not connect to a container, a sliding window may be moved along the connector candidate to verify that the number of intersection points of the drawing strokes with the sliding window's border do not exceed the number of adjacent containers which the candidate connector may join. The size of the sliding window may be set to an empirical size to avoid false intersection with local variances. In one embodiment, the window's radius may be 4 mm. Suppose, for example, that the candidate connector joins N containers (N>=2) and M is the number of intersection points of the drawing strokes of the candidate connector with the sliding window's border, the connector candidate may be considered to be invalid if M>N at some point as the sliding window is moved along the connector candidate. For instance, FIG. 20A illustrates three positions of a sliding window 2004 that is moved along a candidate connector 2010 that joins three containers: container 2002, container 2006 and container 2008. At each position illustrated, the number of intersection points is less than the number of containers that the candidate connector may join. Because the number of intersection points does not exceed the number of containers joined, the connector candidate is valid. FIG. 20B, on the other hand, illustrates detection of an invalid connector candidate 2020 where the number of intersection points in the border of the sliding window 2014 is greater than the number of joined containers 2012, 2016 and 2018. A candidate connector may also be invalid if it includes a drawing stroke that does not join a container. For example, FIG. 20C illustrates a drawing stroke of candidate connector 2030 in sliding window 2024 that does not join any of the containers 2022, 2026 and 2028. As a result, candidate connector 2030 is an invalid connector.

Figure 21:
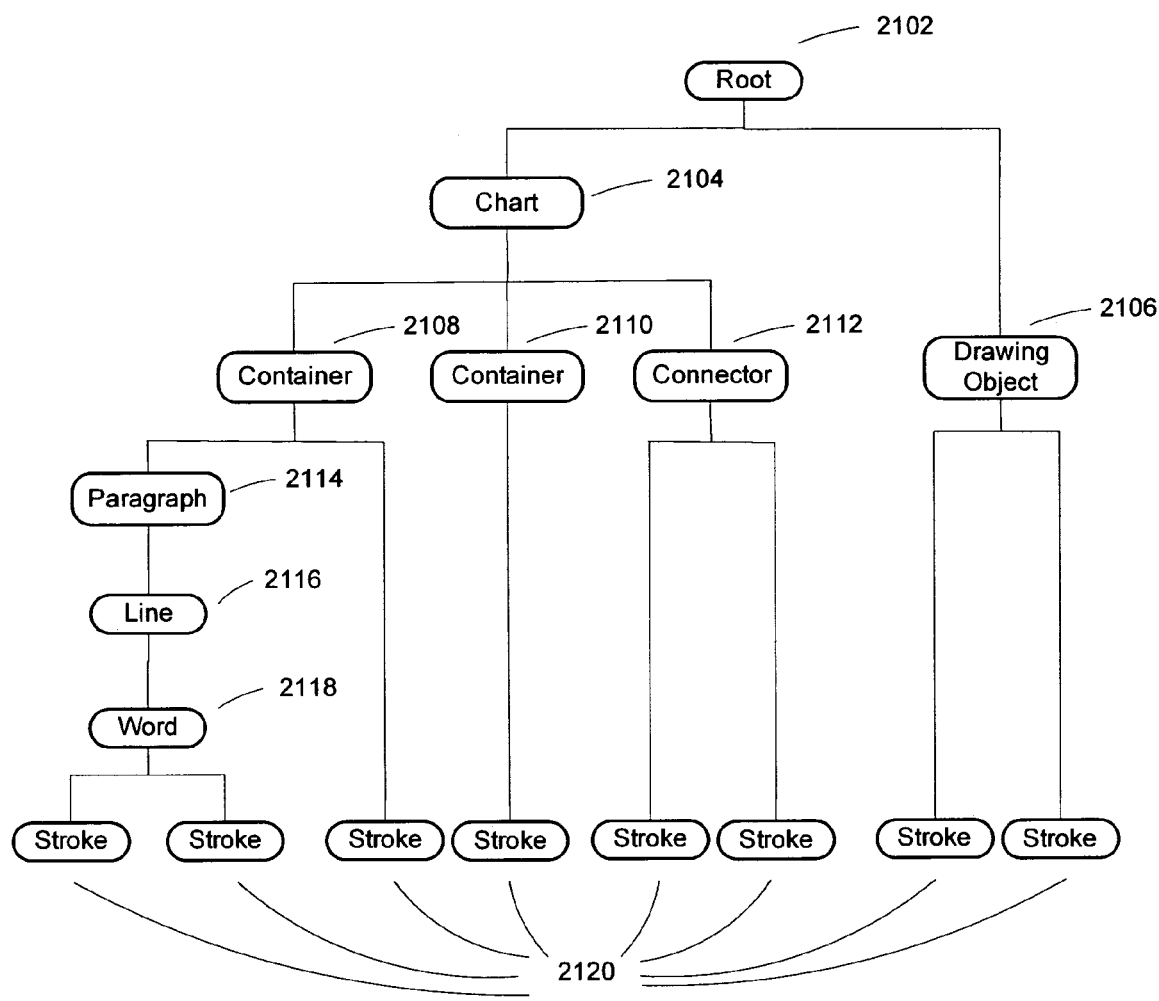
FIG. 21 is an exemplary illustration generally representing a structural relationship of handwritten objects in ink input after performing detection of a drawing object, in accordance with an aspect of the present invention.

Once the containers and connectors have been detected, the structural relationship of handwritten object may be understood. FIG. 21 is an exemplary illustration generally representing a structural relationship of handwritten objects in ink input after performing detection of a drawing object. Root 2002 may represent ink input, such as a page of ink input, that may include one or more drawing objects such as drawing objects 2106. A drawing object, such as chart 2104, may be detected and recognized by performing detection and shape recognition of the hand-drawn objects within the ink input. Chart 2104 may be formed by containers 2108 and 2110 which are joined by connector 2112. Container 2108 may include associated content such as text which may be structurally represented by paragraph 2114 that may be made of line 2116 which has a word 2118 formed by strokes 2120.

After all the containers and connectors have been detected by the described system and method, the hand-drawn objects within the ink input may be completely recognized and generated. By using the present invention, a user may draw diagrams and flow charts freely and without restrictions on the hand-drawn input. One shape may have many strokes and the input order of strokes may be arbitrary so that the system and method may accept any ink as input. Moreover, the strokes could be over-traced or overlapped. For either case, the system and method may automatically detect the correct shapes.

As can be seen from the foregoing detailed description, the present invention provides a system and method for detection of hand-drawn objects. Advantageously, the system and method are insensitive to stroke input order and the number of strokes that may form a hand-drawn shape. Furthermore, the system and method provided are flexible and extensible. As is now understood, the present invention may be used to detect any closed containers and unclosed connectors in a drawing including a diagram and chart. Once detected, the type, location, orientation and size of the shape may be recognized. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for detecting a hand-drawn shape, comprising:
    a chart detector for receiving ink input, the ink input comprising a hand-drawn shape;
    an ink parser operably coupled to the chart detector for parsing the ink input to differentiate writing from drawing within the ink input, and sending the ink input to the chart detector;
    a container detector operably coupled to the chart detector for detecting a closed container within the ink input; and
    a connector detector operably coupled to the chart detector for detecting a connector within the ink input.

2. The system of claim 1 further comprising a shape recognizer operably coupled to the ink parser for recognizing a hand-drawn shape.

3. The system of claim 2 wherein the shape recognizer comprises a container recognizer operably coupled to the shape recognizer.

4. The system of claim 2 wherein the shape recognizer comprises a connector recognizer operably coupled to the shape recognizer.

5. A computer-readable medium having computer-executable components comprising the system of claim 1.

6. A computer-implemented method for detecting a hand-drawn shape, comprising:
receiving ink input comprising a hand-drawn shape;
parsing the ink input to differentiate writing from drawing within the ink input;
performing container detection for each container within the ink input, the container detection finding strokes within the ink input that belong to a container; and
performing connector detection for each connector within the ink input, the connector detection finding strokes within the ink input which belong to a connector.

7. The method of claim 6 further comprising performing chart detection to identify strokes of a diagram within ink input.

8. The method of claim 6 further comprising performing shape recognition to recognize the shape of each container and each connector detected within the ink input.

9. The method of claim 8 further comprising generating a drawing with each container and each connector recognized within the ink input.

10. The method of claim 6 wherein performing container detection comprises performing a spatial search to detect containers.

11. The method of claim 6 wherein performing container detection comprises generating an image grid and positioning strokes from the input ink on the generated image grid.

12. The method of claim 6 wherein performing container detection comprises marking grids of an image grid that are intersected by strokes of the ink input positioned on the image grid.

13. The method of claim 6 wherein performing container detection comprises flood-filling outmost blank grids of an image grid until reaching marked grids that intersect with strokes of the ink input positioned on the image grid.

14. The method of claim 6 wherein performing container detection comprises flood-filling islands of blank grids of an image grid until reaching marked grids that intersect with strokes of the ink input positioned on the image grid.

15. The method of claim 6 wherein performing container detection comprises checking that container candidates are valid containers.

16. The method of claim 15 wherein checking that container candidates are valid containers comprises checking that all border grids which intersect with strokes of the container candidate positioned on an image grid are adjacent to flood-filled island grids.

17. The method of claim 15 wherein checking that container candidates are valid containers comprises removing any strokes of a container candidate positioned on an image grid that do not intersect a border grid in the image grid.

18. The method of claim 15 wherein checking that container candidates are valid containers comprises determining the container candidates are closed containers.

19. The method of claim 15 wherein checking that container candidates are valid containers comprises separating any drawing strokes that are shared between container candidates.

20. The method of claim 19 wherein separating any drawing strokes comprises computing the average distance of the points of the drawing strokes to the center of each candidate container that shares the drawing strokes and assigning a drawing stroke as belonging to the container candidate with the shortest average distance of the points of the drawing strokes to its center.

21. The method of claim 6 wherein performing container detection comprises performing a time order search to detect containers.

22. The method of claim 21 wherein performing a time order search comprises calculating a valid border ratio defined as a valid border length divided by a total border length, where a border comprises marked grids that intersect with strokes of the ink input positioned on an image grid.

23. The method of claim 21 wherein performing a time order search comprises calculating a valid area ratio defined as a valid region area divided by a total area, where the region area comprises an area within a border of marked grids that intersect with strokes of the ink input positioned on an image grid.

24. The method of claim 21 wherein performing a time order search comprises determining the containers from the strokes of the ink input by calculating the likelihood that a sequence of input strokes forms a container.

25. The method of claim 24 wherein calculating the likelihood that a sequence of input strokes forms a container comprises using dynamic programming to group the input strokes into segments where each segment forms a container.

26. The method of claim 6 wherein performing container detection comprises performing content detection to detect any content belonging to a container.

27. The method of claim 26 wherein performing content detection comprises determining the minimal bounding rectangle surrounding the content and calculating its area.

28. The method of claim 26 wherein performing content detection comprises calculating the intersection area ratio of the minimal bounding rectangle with each intersecting container and choosing the container with the largest intersection area ratio of the minimal bounding rectangle with each intersecting container.

29. The method of claim 6 wherein performing connector detection for each connector within the ink input comprises inflating containers whose borders are not adjacent with a grid intersecting unvisited strokes of the ink input positioned on an image grid.

30. The method of claim 29 wherein inflating containers comprises marking grids surrounding the borders of the containers until reaching a grid intersecting the unvisited strokes.

31. The method of claim 29 wherein inflating containers comprises marking grids surrounding the borders of the containers until reaching a border grid of another container.

32. The method of claim 6 wherein performing connector detection for each connector within the ink input comprises flood-filling grids intersecting unvisited strokes of the ink input positioned on an image grid.

33. The method of claim 6 wherein performing connector detection comprises checking that connector candidates are valid connectors.

34. The method of claim 33 wherein checking that connector candidates are valid connectors comprises verifying that the strokes of the connector candidate connect to a container.

35. The method of claim 33 wherein checking that connector candidates are valid connectors comprises verifying that the number of intersection points of the strokes of a connector candidate does not exceed the number of adjacent containers which the connector candidate may join.

36. The method of claim 35 wherein verifying that the number of intersection points of the strokes of a connector candidate does not exceed the number of adjacent containers which the connector candidate may join comprises using a sliding window that may be moved along the connector candidate.

37. A computer-readable medium having computer-executable instructions for performing the method of claim 6.

38. A computer system for detecting a hand-drawn shape, comprising:

means for receiving ink input comprising a hand-drawn shape;

means for detecting a closed container within the ink input;

means for classifying ellipses and circles;

means for classifying polygons; and means for detecting a connector within the ink input.

\* \* \* \* \*